(12) United States Patent
Gupta et al.

(10) Patent No.: US 10,379,996 B2
(45) Date of Patent: Aug. 13, 2019

(54) SOFTWARE ANALYTICS PLATFORM

(71) Applicant: Juniper Networks, Inc., Sunnyvale, CA (US)

(72) Inventors: Vijayendra Kumar Gupta, Bangalore (IN); Mallikarjun Tallapragada, Bangalore (IN); Rahul Jain, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 141 days.

(21) Appl. No.: 15/641,823

(22) Filed: Jul. 5, 2017

(65) Prior Publication Data
US 2019/0012254 A1    Jan. 10, 2019

(51) Int. Cl.
| | |
|---|---|
| *G06F 11/00* | (2006.01) |
| *G06F 11/36* | (2006.01) |
| *G06F 11/34* | (2006.01) |
| *G06F 11/07* | (2006.01) |
| *G06F 11/30* | (2006.01) |
| *G06N 20/00* | (2019.01) |
| *G06N 3/08* | (2006.01) |

(52) U.S. Cl.
CPC ...... *G06F 11/3612* (2013.01); *G06F 11/0706* (2013.01); *G06F 11/079* (2013.01); *G06F 11/0709* (2013.01); *G06F 11/0766* (2013.01); *G06F 11/3051* (2013.01); *G06F 11/3476* (2013.01); *G06F 11/3636* (2013.01); *G06F 11/3664* (2013.01); *G06F 11/3692* (2013.01); *G06N 3/08* (2013.01); *G06N 20/00* (2019.01)

(58) Field of Classification Search
CPC ............ G06F 11/0709; G06F 11/0766; G06F 11/079; G06F 11/3612; G06F 11/3692; G06N 3/08; G06N 20/00
See application file for complete search history.

(56) References Cited

U.S. PATENT DOCUMENTS

| | | | |
|---|---|---|---|
| 7,200,588 B1 | 4/2007 | Srivastava et al. | |
| 9,383,970 B2 | 7/2016 | Joy et al. | |
| 10,152,366 B2 * | 12/2018 | Togawa | G06F 11/079 |
| 2002/0036850 A1 * | 3/2002 | Lenny | G06F 11/2268 |
| | | | 360/31 |

(Continued)

FOREIGN PATENT DOCUMENTS

WO      2014058409 A1     4/2014

OTHER PUBLICATIONS

Extended European Search Report for Application No. EP18175294.0, dated Nov. 30, 2018, 8 pages.

*Primary Examiner* — Joshua P Lottich
(74) *Attorney, Agent, or Firm* — Harrity & Harrity, LLP

(57) ABSTRACT

A device may receive information associated with a software program executing on a device, and may generate event records based on the information associated with the software program. The device may identify pattern information associated with the event records, and may perform data analytics on the event records and the pattern information to identify one or more defects associated with the software program and to determine an expected behavior of the software program. The device may generate one or more reports based on the one or more defects associated with the software program and the expected behavior of the software program, and may provide the one or more reports.

20 Claims, 16 Drawing Sheets

(56) References Cited

U.S. PATENT DOCUMENTS

| | | | |
|---|---|---|---|
| 2006/0085689 A1* | 4/2006 | Bjorsne | G06F 11/0748 |
| | | | 714/39 |
| 2006/0117091 A1* | 6/2006 | Justin | G06F 11/3476 |
| | | | 709/217 |
| 2007/0022320 A1* | 1/2007 | Flocken | G06F 11/0709 |
| | | | 714/37 |
| 2007/0168757 A1* | 7/2007 | Kobrosly | G06F 11/079 |
| | | | 714/46 |
| 2009/0083588 A1* | 3/2009 | Yamashita | G06F 11/0748 |
| | | | 714/47.1 |
| 2009/0292742 A1* | 11/2009 | Morgan | G06F 11/0748 |
| 2012/0166869 A1* | 6/2012 | Young | G06F 11/008 |
| | | | 714/15 |
| 2012/0215907 A1* | 8/2012 | Chung | G06F 21/552 |
| | | | 709/224 |
| 2014/0122935 A1 | 5/2014 | Li et al. | |
| 2014/0365833 A1* | 12/2014 | Bourne | G06F 11/3636 |
| | | | 714/45 |
| 2015/0254165 A1 | 9/2015 | Baril et al. | |
| 2016/0124793 A1 | 5/2016 | Ruan et al. | |
| 2016/0147622 A1* | 5/2016 | Nichols | G06F 16/178 |
| | | | 714/57 |
| 2017/0075793 A1 | 3/2017 | Tahboub et al. | |
| 2017/0118245 A1* | 4/2017 | Tcherchian | H04L 63/1416 |
| 2017/0123875 A1 | 5/2017 | Craik et al. | |
| 2017/0153936 A1* | 6/2017 | Vorganti | G06F 11/079 |
| 2017/0293543 A1* | 10/2017 | Xu | G06F 11/2263 |
| 2017/0364402 A1* | 12/2017 | Chua | G06F 11/079 |

* cited by examiner

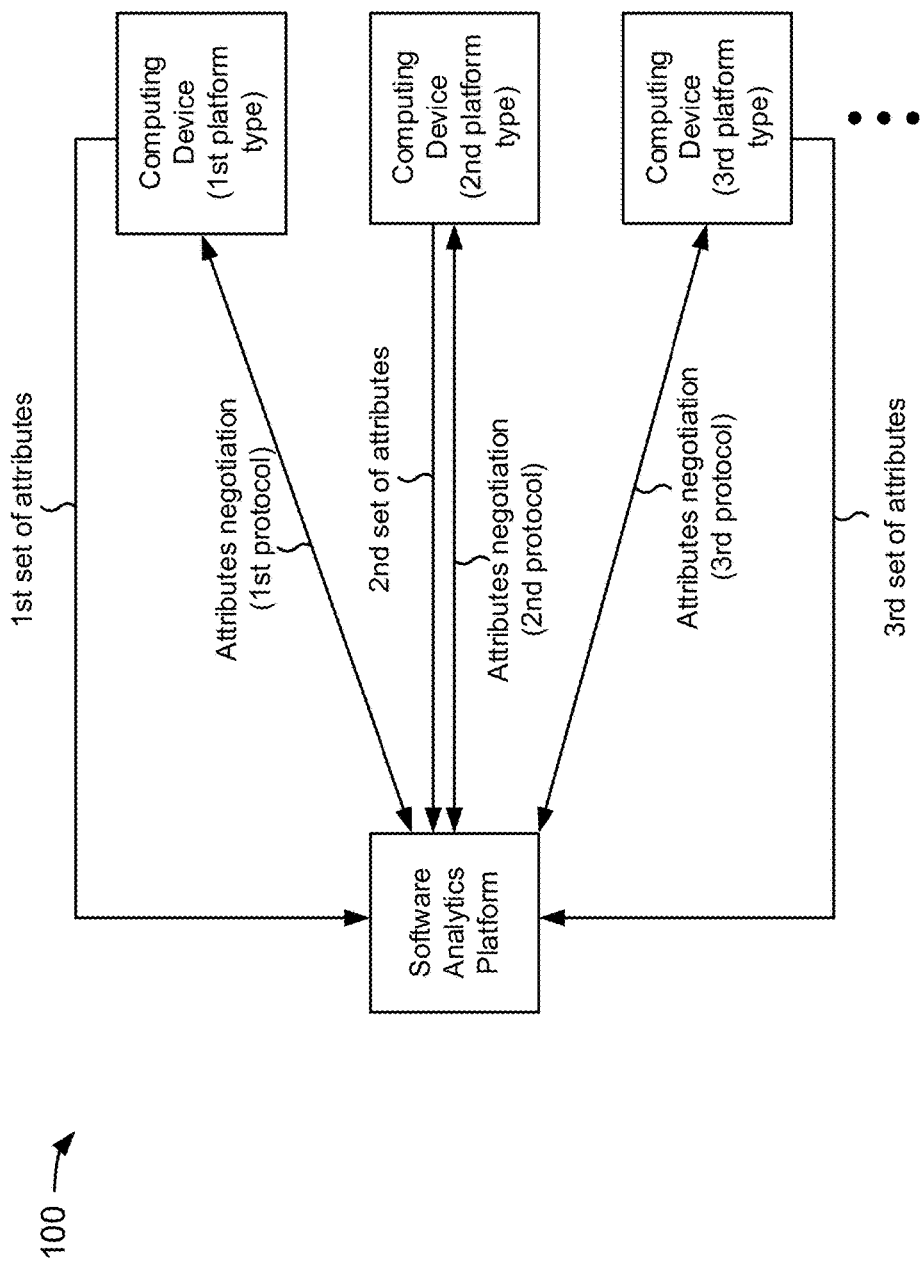

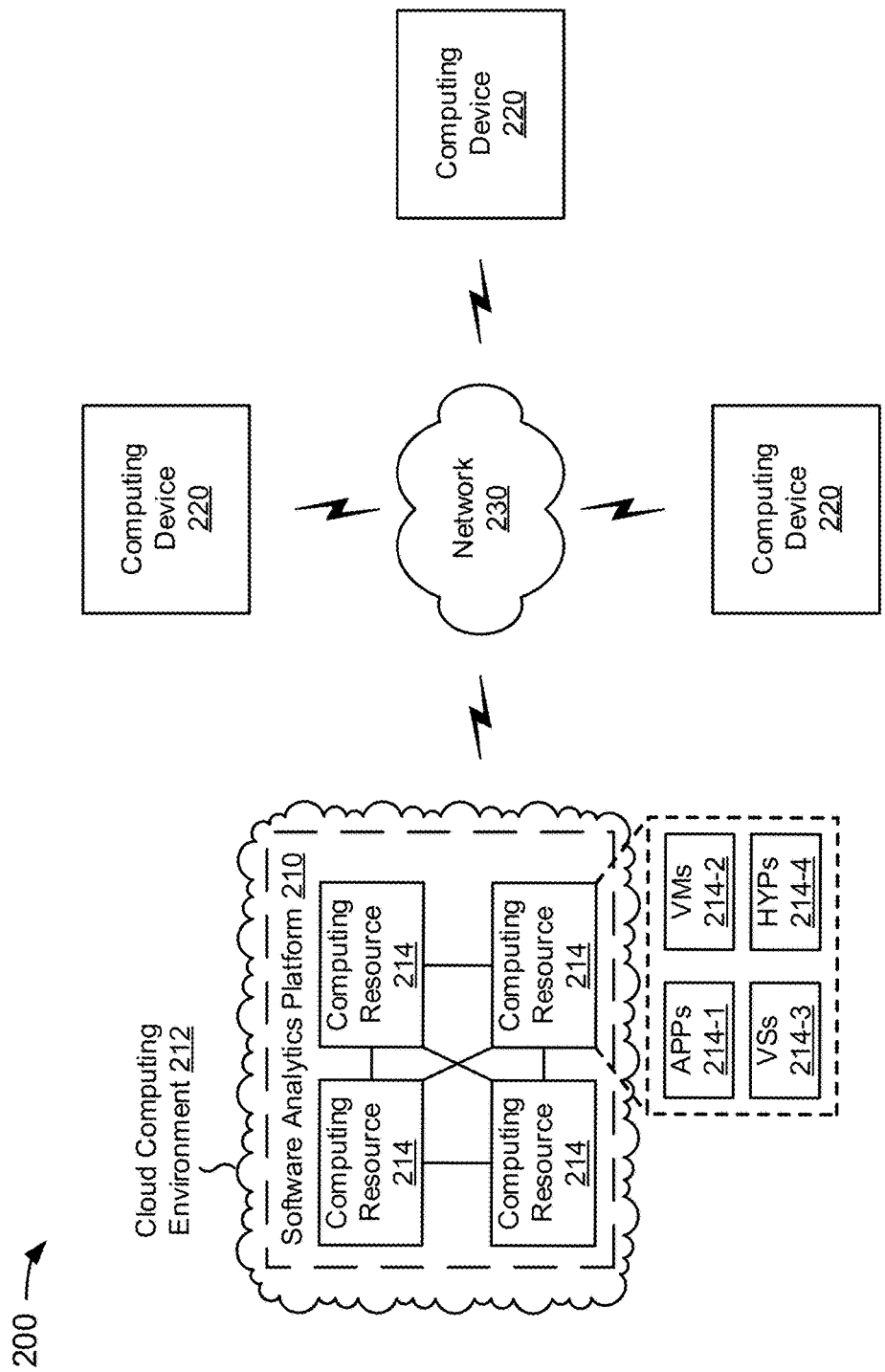

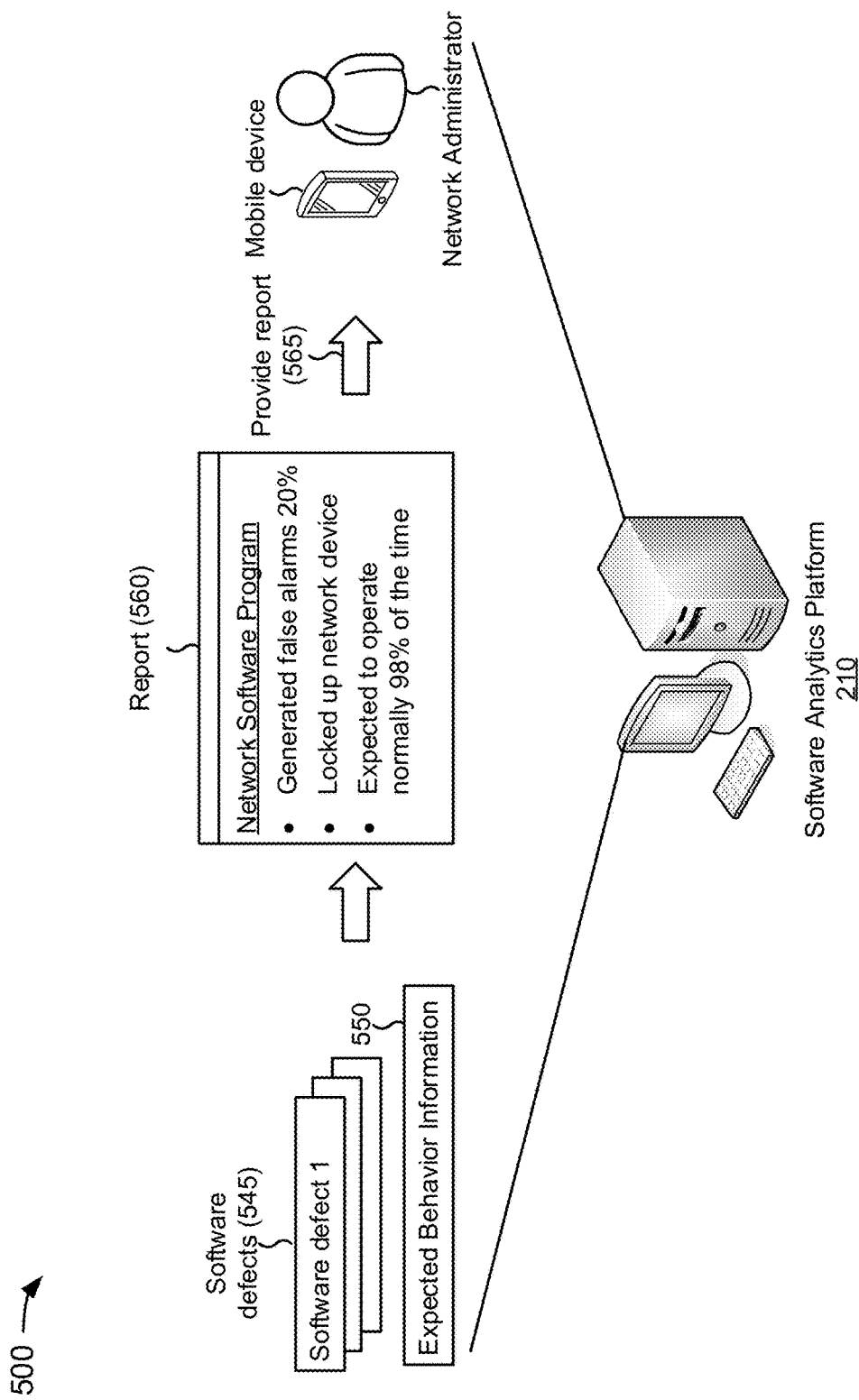

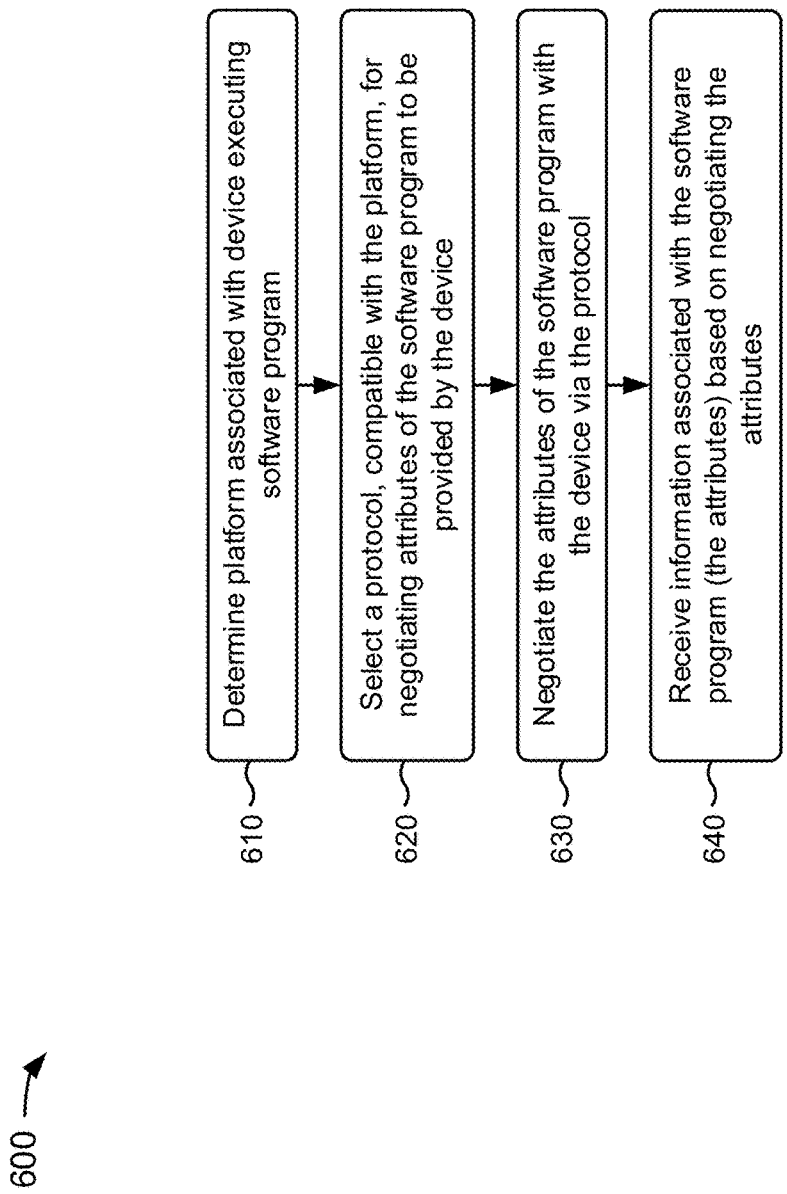

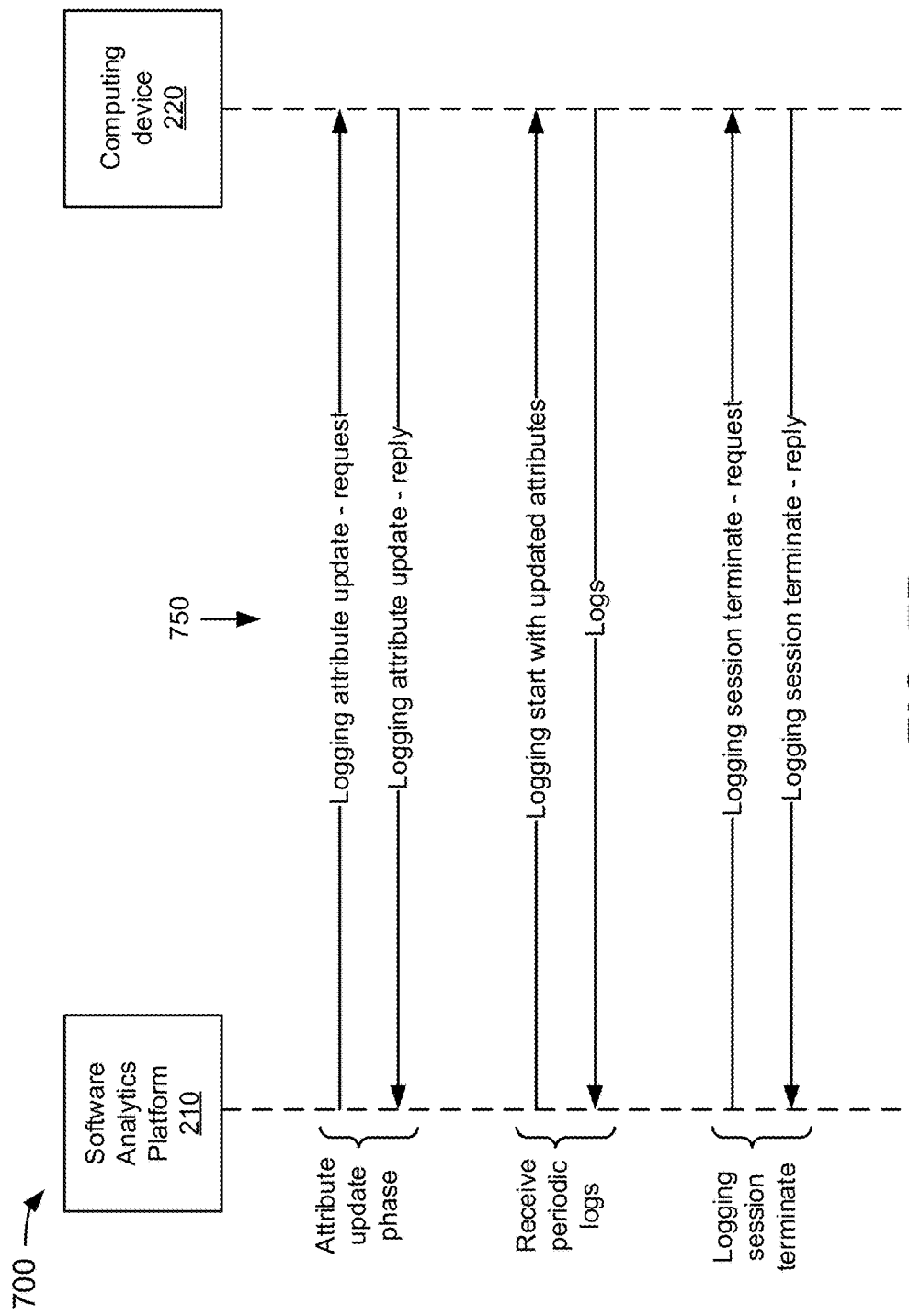

US 10,379,996 B2

SOFTWARE ANALYTICS PLATFORM

BACKGROUND

Software programming correctness, defect identification, and resolution time needs to be shortened with the move towards software-oriented solutions. Software program quality is crucial to win and retain customers because hardware is becoming a commodity and is available as commercial off-the-shelf (COTS) hardware or open hardware. Software programs are now required to run on many platforms (e.g., Windows, UNIX, Linux, network device platforms, other hardware platforms, virtual platforms, and/or the like), with little or no change, based on scale and deployment, and are now more sensitive to errors or defects. Furthermore, software programs are deployed in virtual environments that are accessible to third parties via a programmable interface.

SUMMARY

According to some possible implementations, a device may include one or more processors to: receive information associated with a software program executing on another device; generate event records based on the information associated with the software program; identify pattern information associated with the event records; perform data analytics on the event records and the pattern information to identify one or more defects associated with the software program and to determine an expected behavior of the software program; generate one or more reports based on the one or more defects associated with the software program and the expected behavior of the software program; and provide the one or more reports.

According to some possible implementations, a non-transitory computer-readable medium may store one or more instructions that, when executed by one or more processors, cause the one or more processors to: receive information associated with a software program executing on a device; generate event records based on the information associated with the software program; identify pattern information associated with the event records; perform data analytics on the event records and the pattern information to identify one or more defects associated with the software program and to determine an expected behavior of the software program; generate one or more reports based on the one or more defects associated with the software program and the expected behavior of the software program; and provide the one or more reports.

According to some possible implementations, a method may include receiving, by a device, information associated with a software program executing on another device; generating, by the device, event records based on the information associated with the software program; identifying, by the device, pattern information associated with the event records; performing, by the device, data analytics on the event records and the pattern information to identify one or more defects associated with the software program and to determine an expected behavior of the software program; generating, by the device, one or more reports based on the one or more defects associated with the software program and the expected behavior of the software program; and providing, by the device, the one or more reports.

BRIEF DESCRIPTION OF THE DRAWINGS

FIGS. 1A and 1B are diagrams of an overview of an example implementation described herein;

FIG. 2 is a diagram of an example environment in which systems and/or methods, described herein, may be implemented;

FIGS. 5A-5E are diagrams of an example implementation for identifying defects in and an expected behavior of a software program;

FIG. 6 is a flow chart of an example process for negotiating retrieval of information associated with a software program to be analyzed; and FIGS. 7A-7E are diagrams of an example implementation for negotiating retrieval of information associated with a software program to be analyzed.

DETAILED DESCRIPTION

Figure 1B:
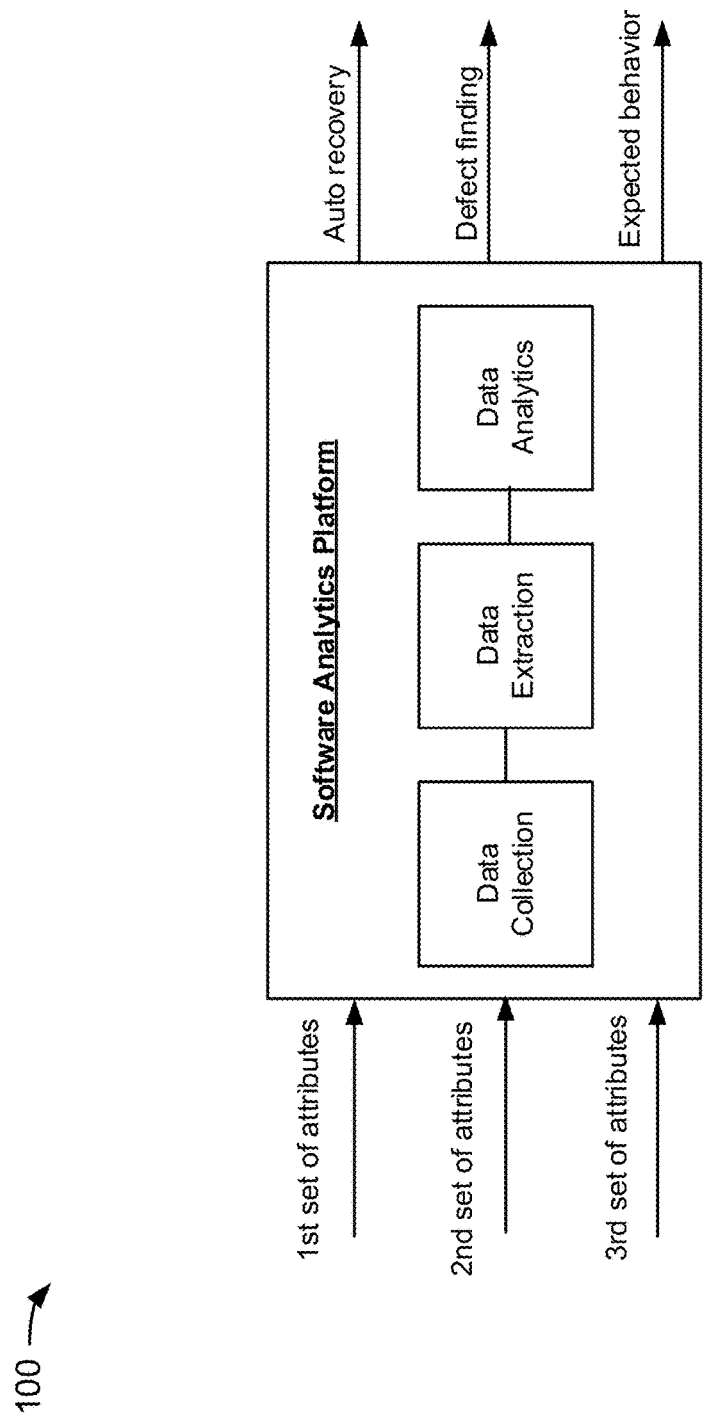

The following detailed description of example implementations refers to the accompanying drawings. The same reference numbers in different drawings may identify the same or similar elements.

An expected behavior of a software program is very subjective, and information necessary to determine the expected behavior is often not readily available. Debug and error logs are typically used by developers to identify, isolate, and resolve software program defects reported during testing of the software program or during actual use of the software program. However, the techniques used by developers are unable to determine an expected behavior of a software program.

Some implementations, described herein, may provide an automated software analytics platform that utilizes debug and error logs to determine an expected behavior of a software program. For example, the software analytics platform may use the debug and error logs to identify defects in a software program, and to record changes in the expected behavior of the software program. In some implementations, the software analytics platform may generate event records and log patterns, and may perform data analytics on the event records and log patterns. In some implementations, the software analytics platform may identify characteristics of the expected behavior of the software program based on performing the data analytics on the event records and log patterns.

In some implementations, the software analytics platform may validate a configuration of a software program (e.g., determine whether the software program satisfies requirements based on platforms and/or a topology for which the software program is to be implemented). In some implementations, the software analytics platform may analyze a software program change for programming errors and/or behavior changes (e.g., some software program changes may be received and annotated to aid analysis of a correctness and/or an expected behavior of the software program). In some implementations, the software analytics platform may analyze the debug and error logs for unexpected behavior, event information, errors, and/or the like, based on a comparison of the debug and error logs with a previous release of the software program. In some implementations, the software analytics platform may utilize debug and error logs (e.g., that include errors, resource outage information, interface and input/output (I/O) information, and/or the like), system logs (e.g., that are used to monitor a system, such as switches or servers in a network), information from a network monitoring system, information from a network provisioning system, and/or the like, to analyze the software program.

In some implementations, the software analytics platform may provide a centralized logging platform that interacts with remote devices and negotiates logging capabilities of the remote devices (e.g., network devices, computing devices, storage devices, and/or the like). In some implementations, the software analytics platform may be used by an online data analytics system, an off-line data analytics system, and/or the like. In some implementations, the software analytics platform may provide an open logging framework, a data collection framework, a monitoring and correction framework, and/or the like. In some implementations, the software analytics platform may use one or more methods (e.g., a type-length-value (TLV) based method) to negotiate and exchange logging capabilities with one or more computing devices, and may convert data and error logs, received from the one or more computing devices, into structured information that may be more easily utilized by data analytics techniques.

FIGS. 1A and 1B are diagrams of an overview of an example implementation 100 described herein. As shown, example implementation 100 may include a software analytics platform, a first platform type (e.g., a Windows platform) computing device, a second platform type (e.g., a network platform) computing device, and a third platform type (e.g., a UNIX platform) computing device.

As shown in FIG. 1A, the software analytics platform may determine that the first platform type computing device is associated with a first protocol. Therefore, the software analytics platform may perform an attributes negotiation with the first platform type computing device using the first protocol. The attributes may include information (e.g., data and error logs) associated with a software program being executed by the first platform type computing device. Based on the attributes negotiation, the software analytics platform may obtain a first set of attributes from the first platform type computing device.

As further shown in FIG. 1A, the software analytics platform may determine that the second platform type computing device is associated with a second protocol. Therefore, the software analytics platform may perform an attributes negotiation with the second platform type computing device using the second protocol. The attributes may include information (e.g., data and error logs) associated with a software program being executed by the second platform type computing device. Based on the attributes negotiation, the software analytics platform may obtain a second set of attributes from the second platform type computing device.

Additionally, as shown in FIG. 1A, the software analytics platform may determine that the third platform type computing device is associated with a third protocol. Therefore, the software analytics platform may perform an attributes negotiation with the third platform type computing device using the third protocol. The attributes may include information (e.g., data and error logs) associated with a software program being executed by the third platform type computing device. Based on the attributes negotiation, the software analytics platform may obtain a third set of attributes from the third platform type computing device. In some implementations, the software analytics platform may convert the first set of attributes, the second set of attributes, and/or the third set of attributes into a format (e.g., structured attributes) that may be more easily utilized by data analytics techniques.

As shown in FIG. 1B, the software analytics platform may include a data collection element, a data extraction element, and a data analytics element. The data collection element of the software analytics platform may receive the first set of attributes, the second set of attributes, and/or the third set of attributes from the computing devices, and may store the received information. The data extraction element of the software analytics platform may extract particular data from the first set of attributes, the second set of attributes, and/or the third set of attributes, such as, for example, data that may be utilized for data analytics. The data analytics element of the software analytics platform may perform data analytics on the particular data. As further shown in FIG. 1B, the software analytics platform may determine automatic recovery information, defect finding information, expected behavior information, and/and/or the like (e.g., associated with the software programs executed by the computing devices) based on performing the data analytics on the particular data.

In this way, the software analytics platform may utilize debug and error logs to determine an expected behavior of a software program. Such an arrangement may enable a device (e.g., the software analytics platform) to perform functions that current systems are unable to perform (e.g., determine an expected behavior of a software program). Furthermore, the software analytics platform conserves resources, associated with computing devices, networks utilizing the computing devices, and/or the like, that would otherwise be utilized to determine bugs and/or errors in software programs.

As indicated above, FIGS. 1A and 1B are provided merely as an example. Other examples are possible and may differ from what was described with regard to FIGS. 1A and 1B.

FIG. 2 is a diagram of an example environment 200 in which systems and/or methods described herein may be implemented. As shown in FIG. 2, environment 200 may include a software analytics platform 210, multiple computing devices 220, and a network 230. Devices of environment 200 may interconnect via wired connections, wireless connections, or a combination of wired and wireless connections.

Software analytics platform 210 includes one or more devices capable of receiving, generating, storing, processing, and/or providing information, such as information described herein. For example, software analytics platform 210 may include a computing device, such as a server device or a group of server devices. In some implementations, software analytics platform 210 may receive information from and/or transmit information to computing devices 220.

In some implementations, software analytics platform 210 may be designed to be modular such that certain software components may be swapped in or out depending on a particular need. As such, software analytics platform 210 may be easily and/or quickly reconfigured for different uses.

In some implementations, as shown, software analytics platform 210 may be hosted in a cloud computing environment 212. Notably, while implementations described herein describe software analytics platform 210 as being hosted in cloud computing environment 212, in some implementations, software analytics platform 210 might not be cloud-based (i.e., may be implemented outside of a cloud computing environment) or may be partially cloud-based.

Cloud computing environment 212 includes an environment that hosts software analytics platform 210. Cloud computing environment 212 may provide computation, software, data access, storage, etc. services that do not require end-user (e.g., user device 220) knowledge of a physical location and configuration of system(s) and/or device(s) that hosts software analytics platform 210. As shown, cloud computing environment 212 may include a group of computing resources 214 (referred to collectively as "computing resources 214" and individually as "computing resource 214").

Computing resource 214 includes one or more personal computers, workstation computers, server devices, or other types of computation and/or communication devices. In some implementations, computing resource 214 may host software analytics platform 210. The cloud resources may include compute instances executing in computing resource 214, storage devices provided in computing resource 214, data transfer devices provided by computing resource 214, etc. In some implementations, computing resource 214 may communicate with other computing resources 214 via wired connections, wireless connections, or a combination of wired and wireless connections.

As further shown in FIG. 2, computing resource 214 includes a group of cloud resources, such as one or more applications ("APPs") 214-1, one or more virtual machines ("VMs") 214-2, virtualized storage ("VSs") 214-3, one or more hypervisors ("HYPs") 214-4, and/or the like.

Application 214-1 includes one or more software applications that may be provided to or accessed by user device 220. Application 214-1 may eliminate a need to install and execute the software applications on user device 220. For example, application 214-1 may include software associated with software analytics platform 210 and/or any other software capable of being provided via cloud computing environment 212. In some implementations, one application 214-1 may send/receive information to/from one or more other applications 214-1, via virtual machine 214-2.

Virtual machine 214-2 includes a software implementation of a machine (e.g., a computer) that executes programs like a physical machine. Virtual machine 214-2 may be either a system virtual machine or a process virtual machine, depending upon use and degree of correspondence to any real machine by virtual machine 214-2. A system virtual machine may provide a complete system platform that supports execution of a complete operating system ("OS"). A process virtual machine may execute a single program, and may support a single process. In some implementations, virtual machine 214-2 may execute on behalf of a user (e.g., user device 220), and may manage infrastructure of cloud computing environment 212, such as data management, synchronization, or long-duration data transfers.

Virtualized storage 214-3 includes one or more storage systems and/or one or more devices that use virtualization techniques within the storage systems or devices of computing resource 214. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 214-4 may provide hardware virtualization techniques that allow multiple operating systems (e.g., "guest operating systems") to execute concurrently on a host computer, such as computing resource 214. Hypervisor 214-4 may present a virtual operating platform to the guest operating systems, and may manage the execution of the guest operating systems. Multiple instances of a variety of operating systems may share virtualized hardware resources.

Computing device 220 includes a device capable of receiving, transmitting, processing, routing, and/or the like, information via network 230. In implementations described herein, computing device 220 may include a server device, a group of server devices, a network device (e.g., a router, a switch, a gateway, a modem, a network interface controller (NIC), a hub, a bridge, a proxy server, an optical add-drop multiplexer (OADM), and/or the like), and/or the like.

Network 230 includes one or more wired and/or wireless networks. For example, network 230 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a cloud computing network, and/or a combination of these or other types of networks.

The number of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
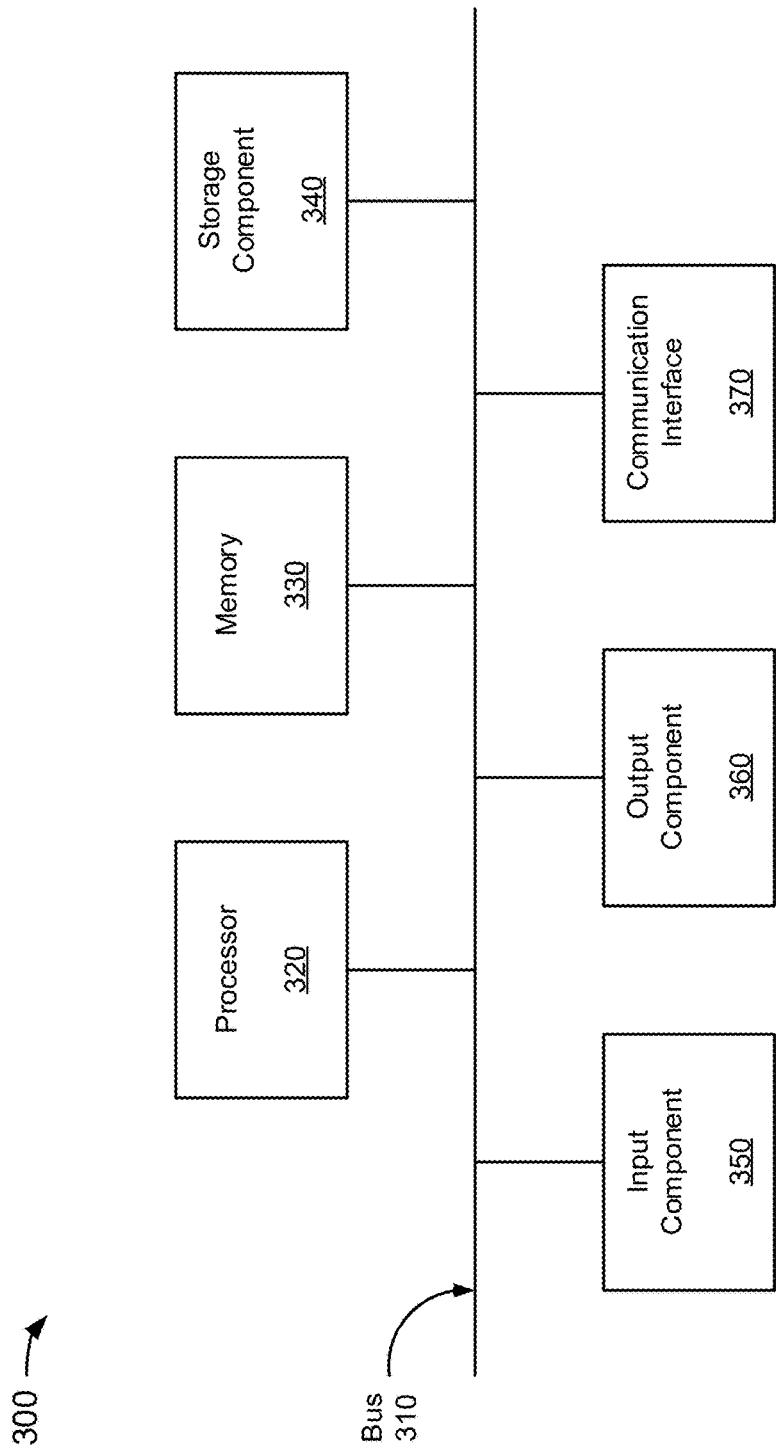
FIG. 3 is a diagram of example components of one or more devices of FIG. 2.

FIG. 3 is a diagram of example components of a device 300. Device 300 may correspond to software analytics platform 210 and/or computing device 220. In some implementations, software analytics platform 210 and/or computing device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processor. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 includes a component that provides output information from device 300 (e.g., a display, a speaker, one or more light-emitting diodes (LEDs), etc.).

Communication interface 370 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
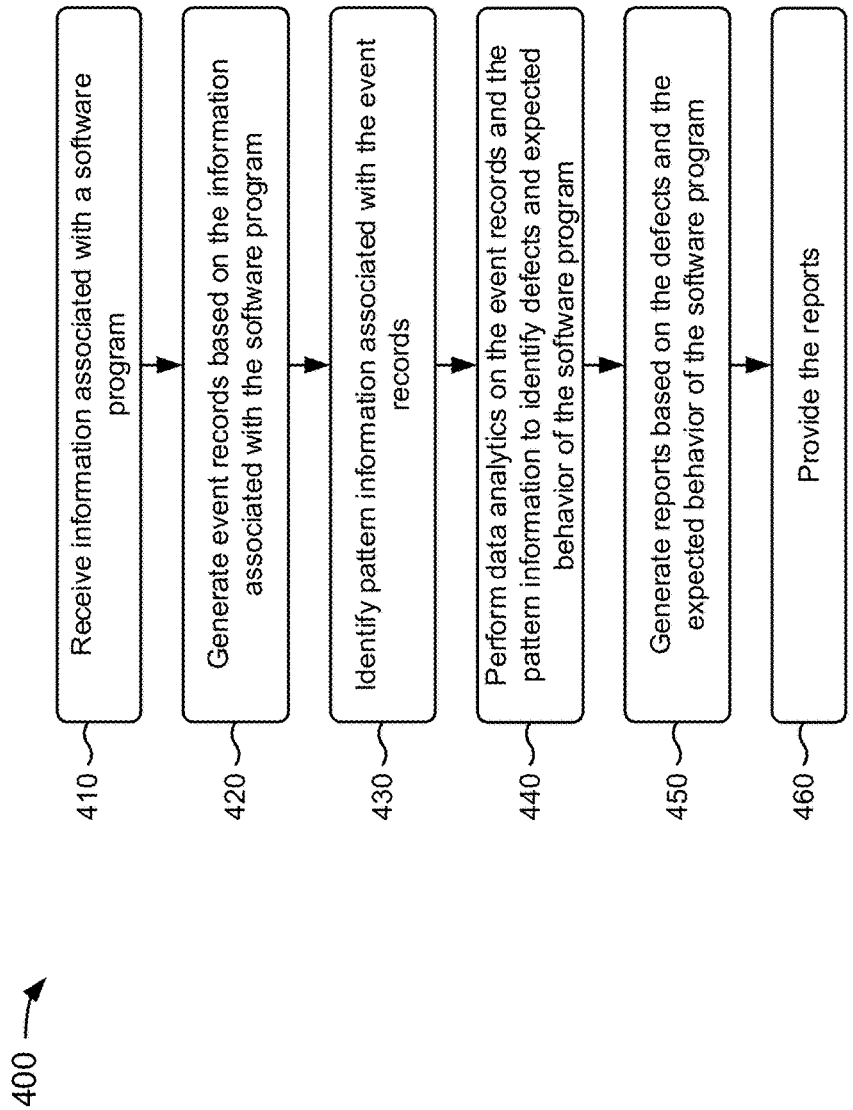
FIG. 4 is a flow chart of an example process for identifying defects in and an expected behavior of a software program.

FIG. 4 is a flow chart of an example process 400 for identifying defects in and an expected behavior of a software program. In some implementations, one or more process blocks of FIG. 4 may be performed by software analytics platform 210. In some implementations, one or more process blocks of FIG. 4 may be performed by another device or a group of devices separate from or including software analytics platform 210.

As shown in FIG. 4, process 400 may include receiving information associated with a software program (block 410). For example, software analytics platform 210 may receive information associated with a software program from computing device 220. In some implementations, the information associated with the software program may include debug and error logs (e.g., that include errors, resource outage information, interface and input/output (I/O) information, and/or the like), system logs (e.g., that are used to monitor a system, such as switches or servers in a network), state information, code coverage information, and/or the like, associated with the software program; information generated by a network monitoring system associated with the software program; information generated by a network provisioning system associated with the software program; and/or the like. Further details of receiving the information associated with the software program are described below in connection with FIGS. 6-7D.

As further shown in FIG. 4, process 400 may include generating event records based on the information associated with the software program (block 420). For example, software analytics platform 210 may generate one or more event records based on the information associated with the software program. In some implementations, software analytics platform 210 may store the event records in a data structure (e.g., a database, an array, a table, a tree structure, a flat file, a linked list, and/or the like). Although a database is utilized herein to describe the data structure, the database may be replaced with or used in conjunction one or more of the aforementioned data structures. In some implementations, software analytics platform 210 may utilize logging to receive events that occur during execution of the software program, and to identify a correctness of the software program. For example, software analytics platform 210 may relate a sequence of events with the debug and error logs associated with the software program. In some implementations, if software analytics platform 210 is unable to receive the events of the software program (e.g., due to a complexity of the software program), software analytics platform 210 may receive events from design documents associated with the software program.

In some implementations, software analytics platform 210 may generate one or more event records based on the received events of the software program. In some implementations, software analytics platform 210 may utilize a unit test framework, a system test framework, integration test cases, regression test cases, scale test cases, and/or the like, to generate the event records based on the received events of the software program.

In some implementations, software analytics platform 210 may receive the events of the software program and/or may generate the event records while incrementally performing tests on the software program. Such an arrangement may prevent software analytics platform 210 from storing too many event records in the data structure, and may conserve storage space in the data structure. For example, software analytics platform 210 may only receive events associated with a configuration of the software program, events associated with a particular feature of the software program, events associated with a particular error and/or exception of the software program, and/or the like, and may only generate event records for such received events.

In some implementations, software analytics platform 210 may receive events associated with a single module, a group of modules, an entire platform, and/or the like, of the software program. Additionally, or alternatively, software analytics platform 210 may receive the events of the software program based on a complexity of a test scenario for the software program, a component-like infrastructure of the software program, a particular application of the software program, and/or the like.

In some implementations, software analytics platform 210 may generate an event record, for an event of the software program, that includes the following example information:

event_record {event_record_id; event_record_type; trigger_type; test_id;
    test_suite_id; traffic_pattern; show_output; software_event_lists;
    software_module_lists}, where the event_record corresponds to the event_record for the event of the software program; the event_record_id corresponds to an identifier (e.g., a numeric identifier, an alphabetical identifier, an alphanumeric identifier, and/or the like) associated with the event_record; the event_record_type corresponds to an event type (e.g., an error, code coverage, a warning, an outage, network monitoring, network provisioning, and/or the like) associated with the event record; the trigger_type corresponds to a trigger_type (e.g., a configuration command, a test case, an automated test suite, an event based on execution of the software program, and/or the like) associated with the event_record; the test_id corresponds to an identifier (e.g., a numeric identifier, an alphabetical identifier, an alphanumeric identifier, and/or the like) of a test associated with the event record; the test_suite_id corresponds to an identifier (e.g., a numeric identifier, an alphabetical identifier, an alphanumeric identifier, and/or the like) of a test suite (e.g., a collection of test cases) associated with the event record; the traffic_pattern corresponds to a traffic pattern associated with a test or a test suite; the show_output corresponds to an output associated with execution of the software program; the software_event_lists corresponds to lists of events associated with execution of the software program; and the software_module_lists corresponds to lists of modules associated with the software program.

The above event record is provided merely as an example. Other examples of the event record are possible, and may differ from what is described for the above event record and with regard to block 420. In some implementations, software analytics platform 210 may receive other events of the software program and/or may generate other examples of event records than what is described above.

As further shown in FIG. 4, process 400 may include identifying pattern information associated with the event records (block 430). For example, software analytics platform 210 may identify patterns associated with the event records, and may generate pattern information based on the identified patterns. In some implementations, software analytics platform 210 may store the pattern information, associated with the identified patterns, in a database. In some implementations, the pattern information may include one or more log pattern records that are stored in the database. In some implementations, the pattern information may include stable log patterns, defined log patterns, and/or the like. In some implementations, the pattern information may vary based on one or more test cases, one or more features, one or more modules, and/or the like, associated with the software program. In some implementations, software analytics platform 210 may utilize a feature addition, a defect resolution, a reference release, and/or the like, associated with the software program, as a reference point for generating the pattern information (e.g., the log pattern records).

In some implementations, software analytics platform 210 may generate a log pattern record, based on the events and the event records associated with the software program, that includes the following example information:

log_pattern {log_pattern_id; log_pattern_type; event_record_id; event_record_type; module_id_list; task_id_list}, where the log_pattern corresponds to the log pattern record; the log_pattern_id corresponds to an identifier (e.g., a numeric identifier, an alphabetical identifier, an alphanumeric identifier, and/or the like) associated with the log pattern record; the log_pattern_type corresponds to a log pattern type (e.g., a stable log pattern, a defined log pattern, and/or the like) associated with the log pattern record; the event_record_id corresponds to an identifier (e.g., a numeric identifier, an alphabetical identifier, an alphanumeric identifier, and/or the like) associated with an event record; the event_record_type corresponds to an event type (e.g., an error, code coverage, a warning, an outage, network monitoring, network provisioning, and/or the like) associated with an event record; the module_id_list corresponds to a list of identifiers (e.g., numeric identifiers, alphabetical identifiers, alphanumeric identifiers, and/or the like) associated with modules of the software program; and the task_id_list corresponds to a list of identifiers (e.g., numeric identifiers, alphabetical identifiers, alphanumeric identifiers, and/or the like) associated with tasks performed by the software program.

The above log pattern record is provided merely as an example. Other examples of the log pattern record are possible, and may differ from what is described for the above log pattern record and with regard to block 430. In some implementations, software analytics platform 210 may determine other log patterns associated with the software program and/or may generate other examples of log pattern records than what is described above.

As further shown in FIG. 4, process 400 may include performing data analytics on the event records and/or the pattern information to identify one or more defects and an expected behavior of the software program (block 440). For example, software analytics platform 210 may perform data analytics on the event records and/or the pattern information (e.g., stored in the database) to identify one or more defects of the software program and an expected behavior of the software program.

A software program, during a life cycle, may undergo several changes based on various releases of the software program, changes to features of the software program, enhancements to the software program, availability of the software program on different platforms, and/or the like. The changes may result in one or more changes to the event records and/or the log pattern records. In some implementations, software analytics platform 210 may perform data analytics to analyze the log pattern records for stable and/or defined patterns to determine one or more changes in an expected behavior of the software program, to validate the changes in the software program, to record the changes in the software program, and/or the like. In some implementations, software analytics platform 210 may validate the changes in the software program based on a review of the changes in the software program. In such implementations, software analytics platform 210 may generate a change log associated with the changes in the software program. In some implementations, software analytics platform 210 may perform data analytics to determine defects in the software program and to generate the change log, on a long term basis, so that software analytics platform 210 may determine the expected behavior of software program.

In some implementations, to perform the data analytics on the event records and/or the pattern information, software analytics platform 210 may apply a machine learning technique, an artificial intelligence technique, a data mining technique, a modeling technique, a neural network technique, another type of big data technique, or a combination of two or more of these techniques to identify one or more defects of the software program and an expected behavior of the software program.

The machine learning technique may include, for example, algorithms that can change based on new data. The machine learning technique may search through data to detect patterns in the data, and may adjust actions of the machine learning algorithm based on the detected patterns. Machine learning algorithms may be categorized as being supervised or unsupervised. Supervised machine learning algorithms may apply what has been learned in the past to new data, and unsupervised machine learning algorithms may draw inferences from data.

The artificial intelligence technique may include, for example, a simulation of human intelligence processes by computers. The processes may include learning (e.g., the acquisition of information and rules for using the information), reasoning (e.g., using the rules to reach approximate or definite conclusions), and self-correction. The artificial intelligence technique may perform tasks, such as identifying patterns in data, more efficiently and accurately than humans, and, when presented with an unfamiliar task, may include enough intelligence to find a solution to the task.

The data mining technique may include, for example, sorting through data to identify patterns and establish relationships. Parameters of the data mining technique may include association (e.g., searching for log patterns where one event is connected to another event); sequence or path analysis (e.g., searching for log patterns where one event leads to another later event); classification (e.g., searching for new log patterns in data, which may result in a change in the way the data is organized); clustering (e.g., determining and documenting groups of facts not previously known); and forecasting (e.g., discovering log patterns in data that can lead to reasonable predictions about the future, which is also known as predictive analytics).

The modeling technique may include, for example, modeling data to resolve complex relationships among the data, to define and categorize the data, and to establish standard definitions and descriptors so that the data may be utilized by other systems.

The neural network technique may include, for example, a system of hardware and/or software patterned after the operation of neurons in the human brain. The neural network technique may solve complex problems, such as pattern recognition problems. The neural network may be initially trained based on large amounts of data. The training may include providing an input to the neural network, and informing the neural network what should be the output.

In some implementations, the defects in the software program may include a bug, an error, a flaw, a failure, or a fault in the software program that causes the software program to produce an incorrect or unexpected result, to behave in unexpected ways, and/or the like. For example, the defects in the software program may include an arithmetic defect (e.g., division by zero, arithmetic overflow, loss of arithmetic precision, and/or the like), a logic defect (e.g., infinite loops, infinite recursion, off-by-one errors, and/or the like), a syntax defect (e.g., using an incorrect operator), a resource defect (e.g., a null pointer dereference, using an uninitialized variable, using an otherwise valid instruction on the wrong data type, access violations, resource leaks, buffer overflow, excessive recursion, use-after-free errors, double free errors, and/or the like), a multi-threading defect (e.g., deadlock due task dependency, race conditions, concurrency errors, and/or the like), an interfacing defect (e.g., incorrect application programming interface (API) usage, incorrect protocol implementation, incorrect hardware handling, incorrect assumptions of a particular platform, incompatible systems, and/or the like), and/or the like.

In some implementations, an expected behavior of the software program may include an accuracy of the software program based on a configuration of the software program, a platform on which the software program executes, a deployment associated with the software program (e.g., in a network, a standalone device, and/or the like), a scale (e.g., a size of deployment) associated with the software program, and/or the like. For example, the expected behavior of the software program may include information indicating that portions (e.g., units, modules, and/or the like) of the software program perform properly, information indicating that the portions of the software program perform properly together (i.e., are properly integrated), information indicating that the software program meets an intended purpose, and/or the like. In some implementations, the expected behavior of the software program may indicate that the portions of the software program perform improperly, that the portions of the software program perform improperly together, that the software program fails to meet the intended purpose, and/or the like. In some implementations, the expected behavior of the software program may include information indicating how the portions of the software program may affect one another at any point in time or when the portions of the software program may affect one another in a given system state. For example, the expected behavior of the software program may include information indicating an ordering of interactions among the portions of the software program, information indicating opportunities for concurrency in the portions of the software program, information indicating time dependencies of the interactions, and/or the like.

In some cases, the expected behavior of the software program may be very descriptive, and may be determined (e.g., by software analytics platform 210) from various documents (e.g., design documents, implementation notes, configuration documents, release management documents, system testing documents, and/or the like). In other cases, consolidated logs and the various documents, associated with the software program, may be unavailable, and determination of the expected behavior of the software program may require an understanding of the software program for a given platform.

In some implementations, software analytics platform 210 may identify and consolidate logs for the expected behavior of the software program. In some implementations, the consolidated logs may include information (e.g., characteristics) associated with the software program. In some implementations, the characteristics may include information generated based on performing the data analytics on the event records and/or the log pattern records. In some implementations, the characteristics may include information identifying a platform and/or an application environment on which the software program is implemented (e.g., a hardware platform, a virtual machine on which the software program is implemented, a cloud-based platform on which the software program is implemented, an open programmable application environment on which the software program is implemented, a third-party application on which the software program is implemented, an operating system on which the software program is implemented, a component on which the software program is implemented, and/or the like). In some implementations, based on the above characteristics, software analytics platform 210 may generate one or more log pattern records for characterizing the software program.

In some implementations, the characteristics may include information identifying a configuration for the platform and/or the application environment on which the software program is implemented. For example, the software analytics platform 210 may identify a configuration of particular platform and/or the application environment on which the software program is implemented, and may use the configuration to define the expected behavior of the software program. In some implementations, the characteristics may include information identifying limits and scales associated with different platforms, information identifying one or more defects in the software program, information identifying a change to the software program that is performed for implementing a feature, adding a feature, deleting a feature, correcting an issue, etc. in the software program, and/or the like In some implementations, software analytics platform 210 may generate an expected behavior record based on the characteristics described herein. Additionally, or alternatively, software analytics platform 210 may generate an expected behavior record based on changes to the software program, log pattern changes, changes to the authors of the software program, configuration changes associated with the software program, and/or the like.

In some implementations, software analytics platform 210 may generate an expected behavior record that includes the following example information:

expected_behaviour {application_id; module_id; platform_type_list; release_version; configuration_list; scale_value_list; defect_list; review_code_change_list; test_suite_id_list}, where the expected_behaviour corresponds to the expected behavior record, the application_id corresponds to an identifier (e.g., a numeric identifier, an alphabetical identifier, an alphanumeric identifier, and/or the like) associated with the software program (e.g., an application), the module_id corresponds to an identifier (e.g., a numeric identifier, an alphabetical identifier, an alphanumeric identifier, and/or the like) associated with a module of the software program, the platform_type_list corresponds to a list of platform types on which the software program is executed, the release_version corresponds to a release version associated with the software program, the configuration_list corresponds to a list of configuration settings associated with the software program, the scale_value_list corresponds to a list of scale values associated with the software program, the defect_list corresponds to list of defects associated with the software program, the review_code_change_list corresponds to a list of code changes to the software program that are to be reviewed, and the test_suite_id_list corresponds to an identifier (e.g., a numeric identifier, an alphabetical identifier, an alphanumeric identifier, and/or the like) of a test suite (e.g., a collection of test cases) associated with the software program.

The above expected behavior record is provided merely as an example. Other examples of the expected behavior record are possible, and may differ from what is described for the above expected behavior record and with regard to block 440. In some implementations, software analytics platform 210 may determine other expected behaviors associated with the software program and/or may generate other examples of expected behavior records than what is described above.

As further shown in FIG. 4, process 400 may include generating one or more reports based on the one or more defects and the expected behavior of the software program (block 450). For example, software analytics platform 210 may generate one or more reports based on the one or more defects and/or the expected behavior of the software program. In some implementations, software analytics platform 210 may generate a variety of reports, such as reports indicating changes in the expected behavior of the software program, reports indicating a quality of the software program, reports that enable quick resolution of errors associated with the software program, and/or the like. In some implementations, software analytics platform 210 may generate reports associated with log pattern changes of the software program, reports associated with changes to the software program, reports associated with authors of the software program, reports associated with configuration changes to the software program, reports associated with platforms on which the software program is executed, and/or the like. Such reports may enable evaluation of the software program, may ensure a correctness of the software program, and may conserve resources that otherwise would be used to evaluate the software program.

As further shown in FIG. 4, process 400 may include providing the one or more reports (block 460). For example, software analytics platform 210 may provide the one or more reports that were generated based on the defects and the expected behavior of the software program. In some implementations, software analytics platform 210 may provide the one or more reports for display to a user (e.g., a software developer, a network administrator, and/or the like) of software analytics platform 210. In some implementations, software analytics platform 210 may provide the one or more reports to one or more users of other devices (e.g., computing devices, mobile devices, server devices, and/or the like), and the other devices may store and/or display the one or more reports. In some implementations, software analytics platform 210 may store the one or more reports (e.g., in the database, memory 330, storage component 340, and/or the like).

In some implementations, software analytics platform 210 may determine one or more recommendations to address the defects and/or the expected behavior of the software program, and may provide such recommendations in the one or more reports or separately from the one or more reports. In some implementations, software analytics platform 210 may determine one or more corrections to address the defects and/or the expected behavior of the software program, and may automatically cause computing device 220 to implement the one or more corrections in the software program. Alternatively, or additionally, software analytics platform 210 may request that a user (e.g., of software analytics platform 210 and/or a device associated with software analytics platform 210) approve the one or more corrections before automatically implementing the one or more corrections. In some implementations, software analytics platform 210 may schedule a technician to correct the defects and/or the expected behavior of the software program, may automatically generate replacement code or a patch to correct the defects and/or the expected behavior of the software program, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 for identifying defects in and an expected behavior of a software program. As shown, implementation 500 may include software analytics platform 210 and computing device 220 (e.g., in the form of a network device 220).

Figure 5A:
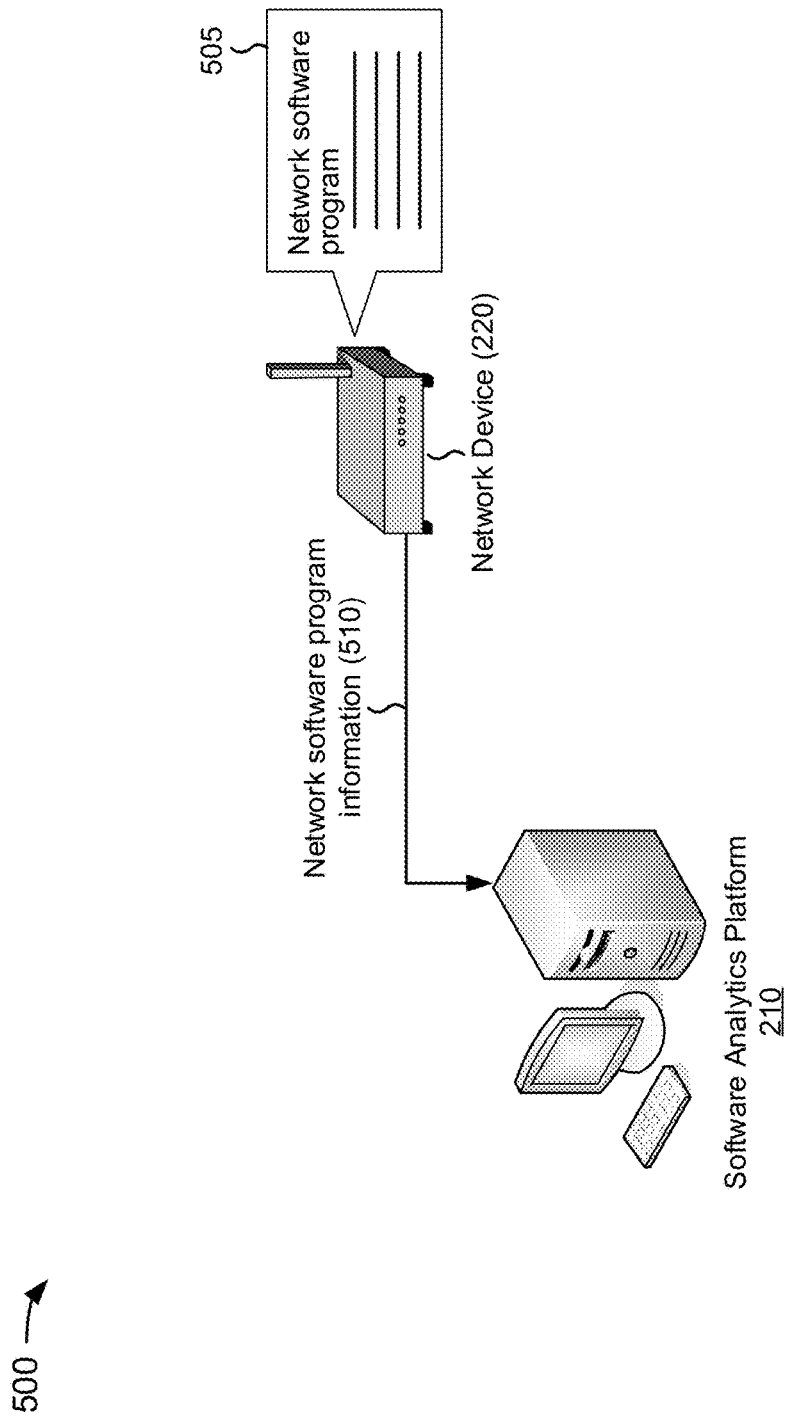

As shown in FIG. 5A, network device 220 may include a network software program 505. Network software program 505 may include a software program that is executed by network device 220 during testing of the software program or during use of the software program in a network associated with network device 220. For example, network software program 505 may include a software program that identifies traffic in the network, and directs traffic to correct destinations in the network. As further shown in FIG. 5A, network device 220 may provide network software program information 510 to software analytics platform 210, and software analytics platform 210 may receive network software program information 510. Network software program information 510 may include debug and error logs, system logs, state information, code coverage information, and/or the like, generated during execution of network software program 505.

Figure 5B:
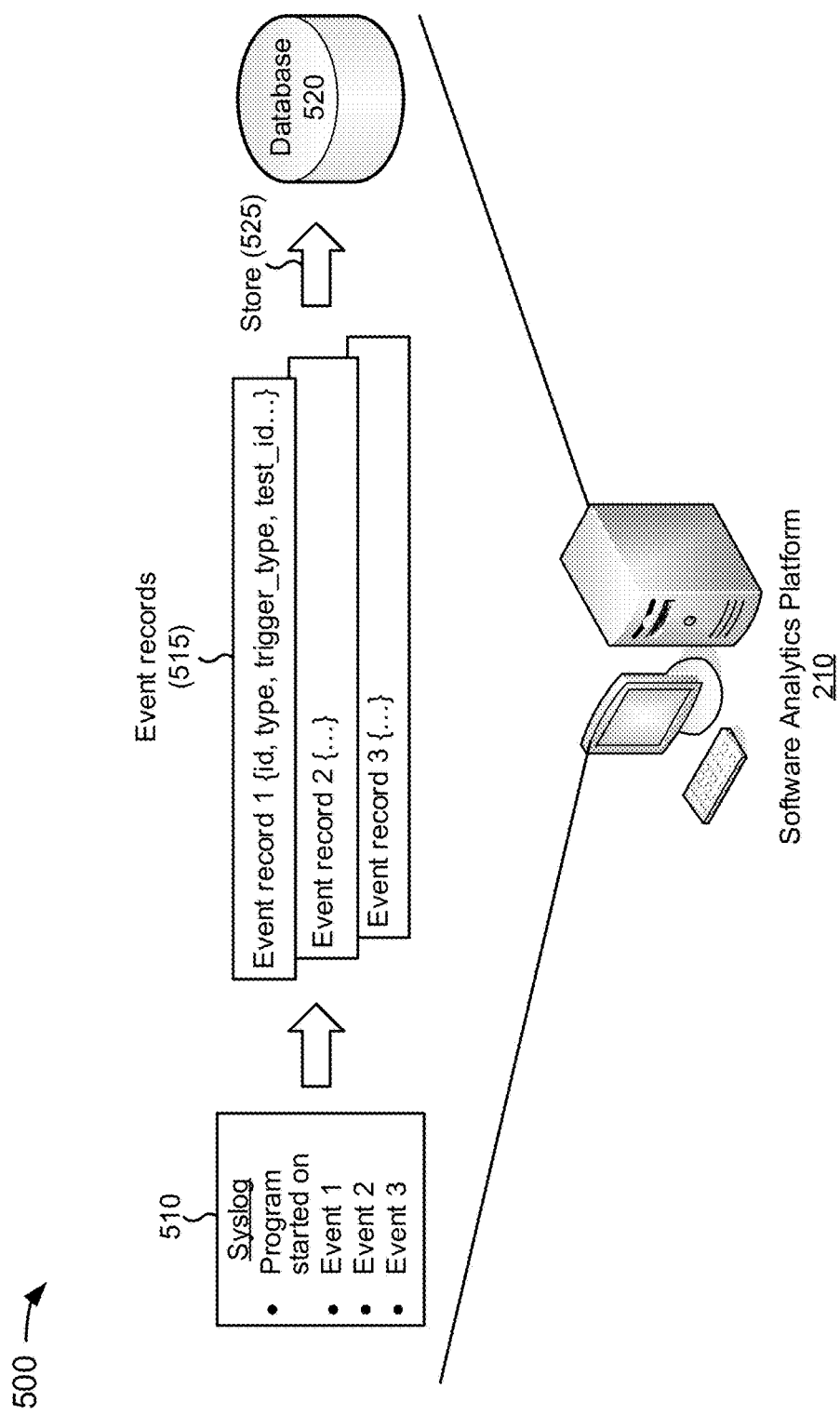

As shown in FIG. 5B, network software program information 510 may include, for example, a system log (Syslog) generated during execution of network software program 505. The system log may include information indicating when network software program 505 began executing (e.g., "Program started on"), information indicating a first event (Event 1) generated during execution of network software program 505 (e.g., an event indicating an error generated by network software program 505), information indicating a second event (Event 2) generated during execution of network software program 505 (e.g., an event indicating that network software program 505 caused a first amount of traffic to be sent to a first network destination), and information indicating a third event (Event 3) generated during execution of network software program 505 (e.g., an event indicating that network software program 505 received a second amount of traffic destined for a second network destination).

As further shown in FIG. 5B, software analytics platform 210 may generate event records 515 based on network software program information 510. For example, software analytics platform 210 may generate a first event record (Event record 1) for the first event (Event 1), a second event_record (Event record 2) for the second event (Event 2), and a third event record (Event record 3) for the third event (Event 3). Each of event records 515 may include some or all of the information described above for an event_record (e.g., information indicating an event_record_id, an event_record_type, a trigger_type, a test_id, a test_suite_id, a traffic_pattern, a show_output, a software_event_lists, and a software_module_lists). Software analytics platform 210 may store event records 515 in a database 520 associated with software analytics platform 210, as indicated by reference number 525.

Figure 5C:
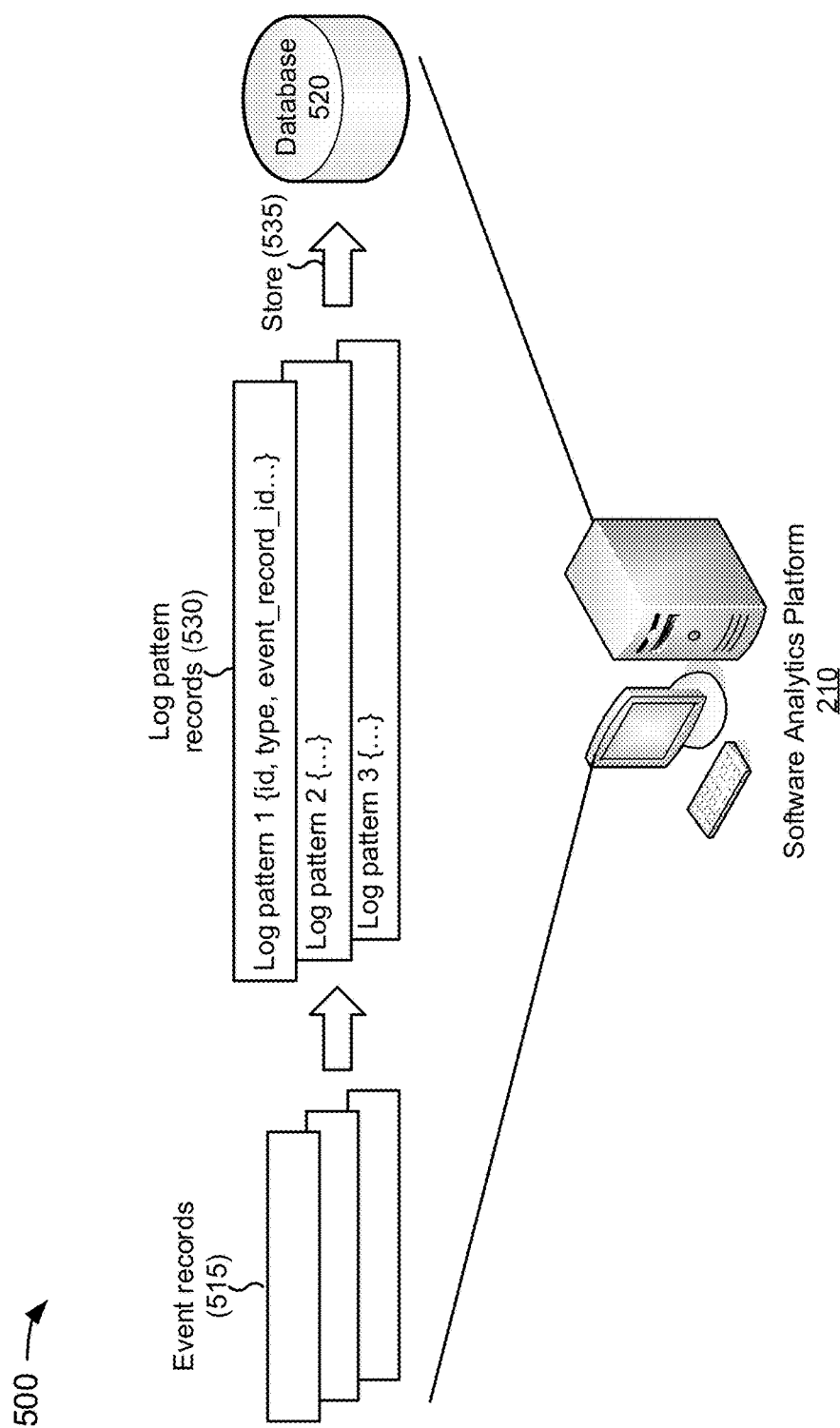

As shown in FIG. 5C, software analytics platform 210 may determine log pattern records 530 (e.g., pattern information) based on event records 515. For example, software analytics platform 210 may determine a first log pattern record (Log pattern 1) (e.g., indicating that network software program 505 generates an error for a particular type of traffic), a second log pattern record (Log pattern 2) (e.g., indicating that network software program 505 always correctly forwards traffic to a first network destination), and a third log pattern record (Log pattern 3) (e.g., indicating that network software program 505 stopped executing for a period of time) based on event records 515. Each of log pattern records 530 may include some or all of the information described above for a log pattern record (e.g., information indicating a log_pattern_id, a log_pattern_type, an event_record_id, an event_record_type, a module_id_list, and a task_id_list). Software analytics platform 210 may store log pattern records 530 in database 520, as indicated by reference number 535.

Figure 5D:
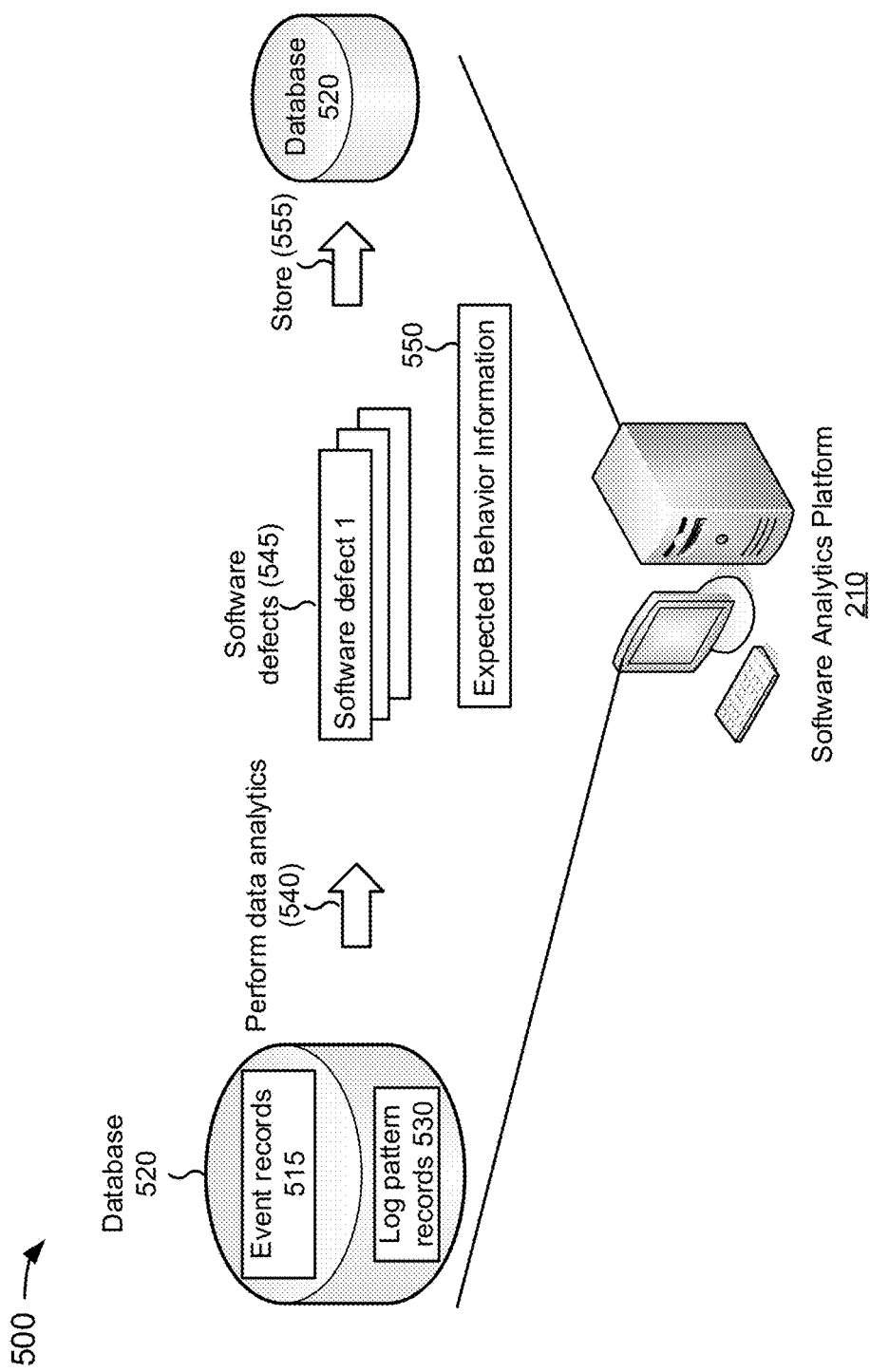

As shown in FIG. 5D, and by reference number 540, software analytics platform 210 may perform data analytics on events records 515 and log pattern records 530 stored in database 520. Based on performing the data analytics, software analytics platform 210 may identify one or more software defects 545 (e.g., Software defect 1, indicating that network software program 505 is unable to forward a particular type of traffic) and expected behavior information 550 associated with network software program 505. Expected behavior information 550 may include information indicating an expected behavior of network software program 505 (e.g., information indicating that network software program 505 always filters out a particular type of traffic). In some implementations, expected behavior information 550 may include one or more expected behavior records. Each of the expected behavior records may include some or all of the information described above for an expected behavior record (e.g., information indicating an application_id, a module_id, a platform_type_list, a release_version, a configuration_list, a scale_value_list, a defect_list, a review_code_change_list, and a test_suite_id_list). Software analytics platform 210 may store information identifying software defects 545 and expected behavior information 550 in database 520, as indicated by reference 555.

As shown in FIG. 5E, software analytics platform 210 may generate one or more reports 560 based on software defects 545 and expected behavior information 550 associated with network software program 505. For example, software analytics platform 210 may generate a report 560 that includes information indicating that network software program 505 generated false alarms 20% of the time, occasionally locked up network device 220, and is expected to operate normally 88% of the time. As shown by reference number 565, software analytics platform 210 may provide report 560 to a device (e.g., a computer, a mobile device, and/or the like) associated with a network administrator. The network administrator may utilize the device to review report 560 and to take appropriate action.

As indicated above, FIGS. 5A-5E are provided merely as an example. Other examples are possible and may differ from what was described with regard to FIGS. 5A-5E. In some implementations, the various operations described in connection with FIGS. 5A-5E may be performed automatically (without user input) or at the request of a user.

FIG. 6 is a flow chart of an example process 600 for negotiating retrieval of information associated with a software program to be analyzed. In some implementations, some or all of process 600 may correspond to process block 410 of FIG. 4. In some implementations, one or more process blocks of FIG. 6 may be performed by software analytics platform 210. In some implementations, one or more process blocks of FIG. 6 may be performed by another device or a group of devices separate from or including software analytics platform 210.

As shown in FIG. 6, process 600 may include determining a platform associated with a device that is executing a software program (block 610). For example, software analytics platform 210 may determine a platform (e.g., an operating system) associated with computing device 220 that is executing a software program. In some implementations, software analytics platform 210 may maintain or have access to platform information indicating platforms associated with devices executing a software program. In such implementations, software analytics platform 210 may identify a particular device that is executing the software program, and may determine the platform associated with the particular device based on the platform information. In some implementations, software analytics platform 210 may receive (e.g., via user input) information identifying a particular device that is executing the software program, and may determine the platform associated with the particular device based on the information identifying the particular device. In some implementations, software analytics platform 210 may receive (e.g., via user input) information identifying a platform associated with a particular device that is executing the software program, and may determine the platform associated with the particular device based on the received information.

In some implementations, the platforms, associated with a device that is executing the software program, may include Windows, UNIX, Linux, Android, Mac OS X, network device platforms, server platforms, other hardware platforms, virtual platforms, and/or the like. The above platforms are provided merely as examples. Other example platforms are possible and may differ from what is described with regard to block 610. For example, software analytics platform 210 may use the platforms described herein with other proprietary systems to ensure compatibility with software analytics platform 210.

As further shown in FIG. 6, process 600 may include selecting a protocol, compatible with the platform, for negotiating attributes of the software program to be provided by the device (block 620). For example, software analytics platform 210 may select a protocol that is compatible with the platform associated with computing device 220 that is executing the software program, and may negotiate attributes of the software program to be provided by computing device 220. In some implementations, software analytics platform 210 may maintain or have access to protocol information indicating protocols that are associated with platforms. In such implementations, software analytics platform 210 may determine the platform of the device that is executing the software program (as described above), and may select the protocol associated with the determined platform based on the protocol information.

In some implementations, the selected protocol may enable software analytics platform 210 to communicate and negotiate attributes with the device that is executing the software program. In some implementations, the protocol may include a protocol capable of communicating with Windows, UNIX, Android, Mac OS X, Linux, network device platforms, server platforms, other hardware platforms, virtual platforms, and/or the like. For example, the protocol may include an Institute of Electrical and Electronics Engineers Standards Association (IEEE) 802.1Q protocol, an OpenFlow protocol, a network configuration (NetConf) protocol, an Open vSwitch Database (OVSDB) protocol, and/or the like. In some implementations, software analytics platform 210 may utilize existing protocols or may extend the existing protocols using a type-length-value (TLV) negotiation method described elsewhere herein.

As further shown in FIG. 6, process 600 may include negotiating the attributes of the software program with the device and via the protocol (block 630). For example, software analytics platform 210 may negotiate the attributes of the software program with computing device 220 via the selected protocol. In some implementations, if a particular attribute was previously negotiated with computing device 220, software analytics platform 210 may update the particular attribute at any point in time. In some implementations, software analytics platform 210 may negotiate the attributes of the software program with computing device 220 via an attribute negotiation session. In such implementations, if an attribute negotiation session terminates based on a change in a capability of computing device 220, software analytics platform 210 may establish another attribute negotiation session with computing device 220.

In some implementations, software analytics platform 210 may negotiate the attributes of the software program with computing device 220 via the OpenFlow protocol. When implementing the OpenFlow protocol, software analytics platform 210 may use particular message types (e.g., symmetric messages, asymmetric messages, and/or the like) to exchange information with computing device 220. For example, software analytics platform 210 may use symmetric messages and a particular TLV (e.g., an experimenter TLV of the OpenFlow protocol) for negotiating and exchanging information with computing device 220. In some implementations, software analytics platform 210 may obtain an experimenter identifier and definitions of experimenter messages for the OpenFlow protocol.

In some implementations, software analytics platform 210 may negotiate the attributes of the software program with computing device 220 via the OVSDB protocol. For example, software analytics platform 210 may use a JavaScript Object Notation Remote Procedure Call (JSON-RPC) to exchange information with computing device 220. In such implementations, software analytics platform 210 may provide a list of attributes to computing device 220 with a request for the attributes. In some implementations, computing device 220 may return an acknowledgement (Ack) message or negative acknowledgement (NAck) message in response to the request for the attributes. The acknowledgement message and/or the negative acknowledgement message may include a flag for each attribute in the list of attributes. In some implementations, software analytics platform 210 may receive the flags in a response array that indicates a true state (i.e., attribute available) or a false state (i.e., attribute not available) for each attribute in the list of attributes.

In some implementations, software analytics platform 210 may negotiate the attributes of the software program with computing device 220 via the NetConf protocol. For example, software analytics platform 210 may use an Extensible Markup Language (XML)-based RPC mechanism to exchange information with computing device 220. In such implementations, software analytics platform 210 may convert attribute information into an XML format, and may provide the converted attribute information to computing device 220.

In some implementations, software analytics platform 210 may negotiate the attributes of the software program with computing device 220 via the 802.1Qbr protocol. For example, software analytics platform 210 may negotiate the attributes using a Link Layer Discovery Protocol (LLDP), a Cisco Discovery Protocol (CDP), JSON-RPC, and/or the like. In some implementations, software analytics platform 210 may negotiate the attributes of the software program with computing device 220 via other protocols (e.g., proprietary protocols).

As further shown in FIG. 6, process 600 may include receiving information associated with the software program (the attributes) based on negotiating the attributes (block 640). For example, software analytics platform 210 may receive information associated with the software program (the attributes) based on negotiating the attributes. In some implementations, the attributes may include any information provided in debug and error logs, any information provided in system logs, any information provided from a network monitoring system, any information provided from a network provisioning system, and/or the like, associated with the software program. For example the attributes may include kernel messages, user-level messages, mail system messages, system daemons, security/authorization messages, clock daemons, emergency messages, alerts, critical condition messages, error conditions, hard device errors, warning conditions, notice conditions, informational messages, debug messages, error codes, events occurring during execution, user change messages, security messages, system information (e.g., types of processors executing the software program, a quantity of processors executing the software program, a quantity of memory available to the platform during execution of the software program, a quantity of memory used in connection with executing the software program, etc.), and/or the like.

In some implementations, software analytics platform 210 may convert the attributes into one or more structured formats (e.g., one or more structured logs) that ensure uniform attribute definitions across the platform of computing device 220. In some implementations, the structured logs may be platform independent and/or platform dependent, and may be in a format that may be more easily processed by the data analytics of software analytics platform 210. Such structured logs may reduce usage of processing resources by software analytics platform 210 when performing the data analytics.

In some implementations, a structured log may include a static/dynamic logging attribute, an online/offline attribute, a logging category attribute, a temporal order of events attribute, an event category attribute, a platform/application/module/tasks/thread attribute, an object/life cycle attribute, an object/resource attribute, a granularity attribute, a logging file size attribute, a server based logging attribute, a module/feature/daemon/task/thread life cycle attribute, a protocol state machine attribute, a log string type attribute, and/or the like. The above-mentioned attributes are provided as examples of attributes that may be included in a structured log. In some implementations, the structured log may include additional attributes, fewer attributes, different attributes, or differently arranged attributes than those described above.

In some implementations, the static/dynamic logging attribute may indicate that the structured log is to include information generated during compilation of the software program or during execution of the software program. In some implementations, the online/offline attribute may indicate that the structured log is to include information specifying whether a login for the software program is online or offline. In some implementations, the logging category attribute may indicate that the structured log is to include information from a particular log category (e.g., an error log, a debug log, a system log, and/or the like) associated with the software program.

In some implementations, the temporal order of events attribute may indicate that the structured log is to include timestamps calculated for the information provided in the structured log. Additionally, or alternatively, the temporal order of events attribute may indicate that the structured log is to include information identifying a difference in time between events of the software program. The difference in time between events may enable software analytics platform 210 to determine race conditions associated with the software program.

In some implementations, the event category attribute may indicate that the structured log is to include a configuration time, configuration states, periodic events, a memory allocation event, a process state machine event, and/or the like, associated with the software program. In some implementations, the platform/application/module/tasks/thread attribute may indicate that the structured log is to include information identifying a platform, an application, a module, a task, a thread, and/or the like, associated with the software program. In some implementations, the object/life cycle attribute may indicate that the structured log is to include information identifying when an object, associated with the software program, is created, modified, deleted, and/or the like. In some implementations, the object/resource attribute may indicate that the structured log is to include information identifying when an object and/or a resource, associated with the software program, is created, modified, deleted, and/or the like.

In some implementations, the granularity attribute may indicate that the structured log is to include information identifying a granularity of the structured log (e.g., the granularity may be defined on a per module, per software feature, per task, per thread object identifier, per timestamp, per platform, per object, per object identifier, per memory usage, per action, per log message, and/or the like, basis associated with software program). In some implementations, the logging file size attribute may indicate that the structured log is to include information identifying a log size for each computing device 220 associated with the software program. In some implementations, the server based logging attribute may indicate that the structured log is to include information identifying a server address (e.g., a server Internet protocol (IP) address) and/or server location information.

In some implementations, the module/feature/daemon/task/thread life cycle attribute may indicate that the structured log is to include information identifying a module, a feature, a daemon, a task, a thread life cycle, and/or the like, associated with the software program. In some implementations, the protocol state machine attribute may indicate that the structured log is to include information identifying a protocol state machine associated with the software program. In some implementations, the log string type attribute may indicate that the structured log is to include information identifying a string to be associated with object logs, module logs, feature logs, state machine logs, and/or the like, associated with the software program.

In some implementations, software analytics platform 210 may utilize the one or more structured logs to generate the one or more event records and the one or more log pattern records. In such implementations, the structured logs may enable software analytics platform 210 to more quickly generate the event records and the log pattern records in a format that may be more easily processed by the data analytics of software analytics platform 210. Thus, the structured logs may reduce usage of processing resources by software analytics platform 210 when generating the event records and the log pattern records and when performing the data analytics.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example implementation 700 for negotiating retrieval of information associated with a software program to be analyzed. As shown, implementation 700 may include software analytics platform 210 and two computing devices 220 (e.g., in the form of a server device 220 and a network device 220).

Figure 7A:
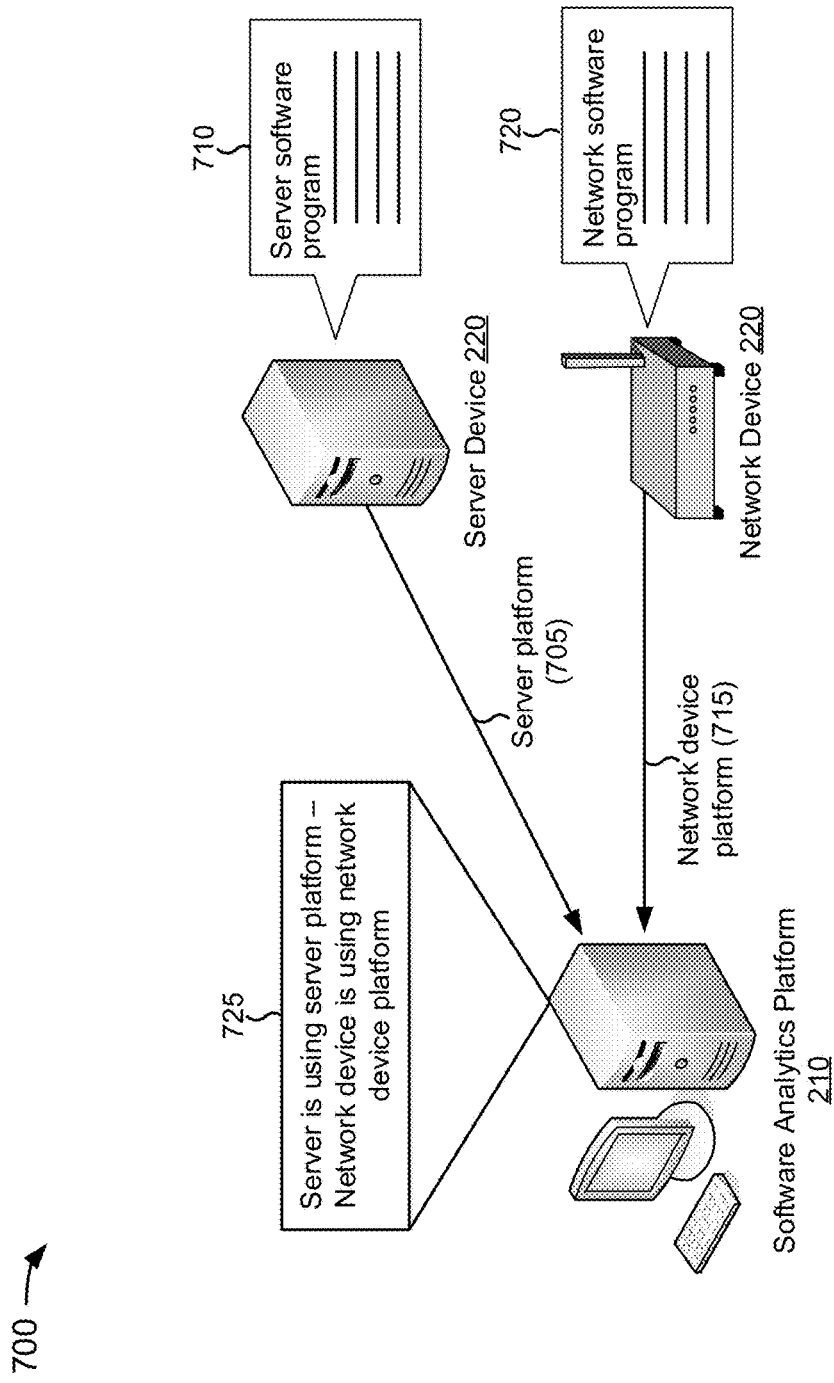

As shown in FIG. 7A, software analytics platform 210 may receive information 705 indicating that server device 220 is utilizing a server platform to execute a server software program 710 included in server device 220. Server software program 710 may include a software program that is executed by server device 220 during testing of the software program or during use of the software program in a network associated with server device 220. For example, server software program 710 may include a software program that caches content for retrieval by client devices associated with the network.

As further shown in FIG. 7A, software analytics platform 210 may receive information 715 indicating that network device 220 is utilizing a network device platform to execute a network software program 720 included in network device 220. Network software program 720 may include a software program that is executed by network device 220 during testing of the software program or during use of the software program in a network associated with network device 220. For example, network software program 720 may include a software program that filters out malicious traffic from the network.

In some implementations, software analytics platform 210 may determine platforms associated server device 220 and network device 220. For example, and as indicated by reference number 725, software analytics platform 210 may determine that server device 220 is utilizing the server platform based on information 705 indicating that server device 220 is utilizing the server platform, and may determine that network device 220 is using the network device platform based on information 715 indicating that network device 220 is utilizing the network device platform.

Figure 7B:
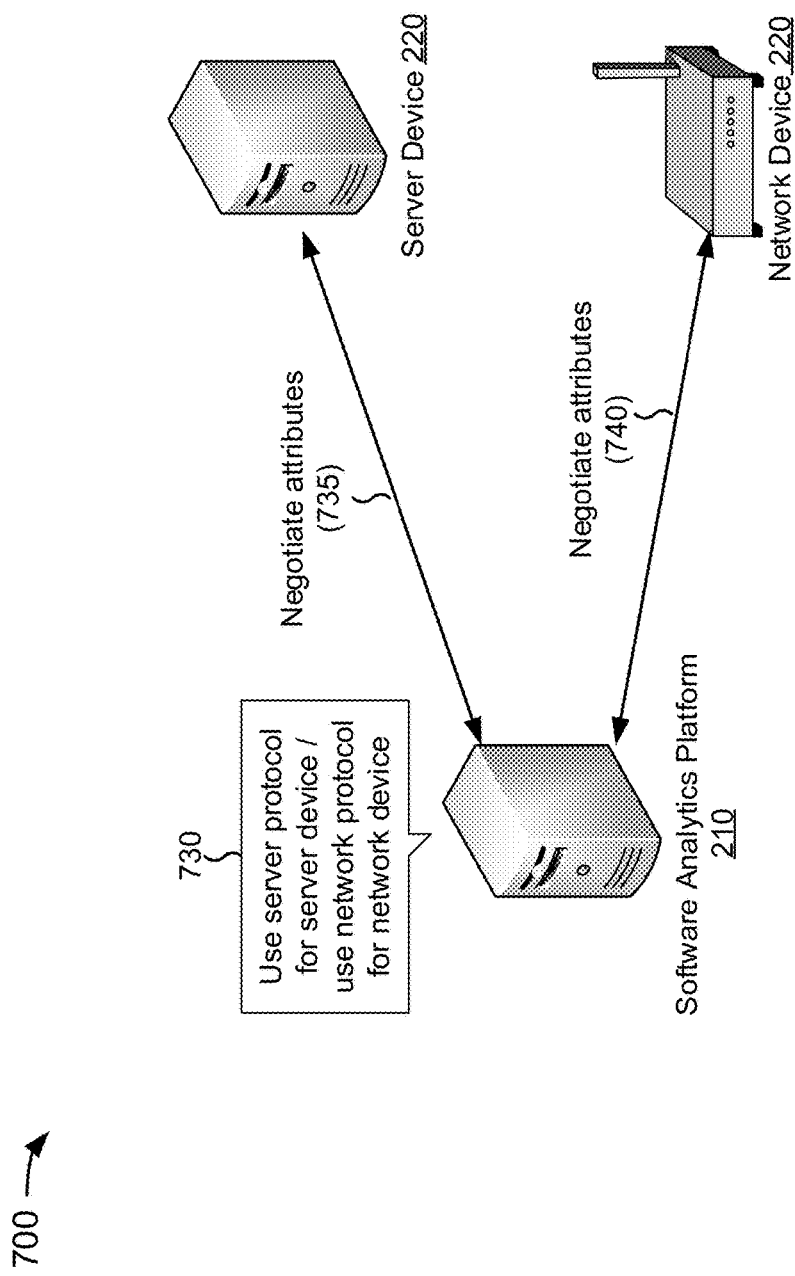
Figure 7C:
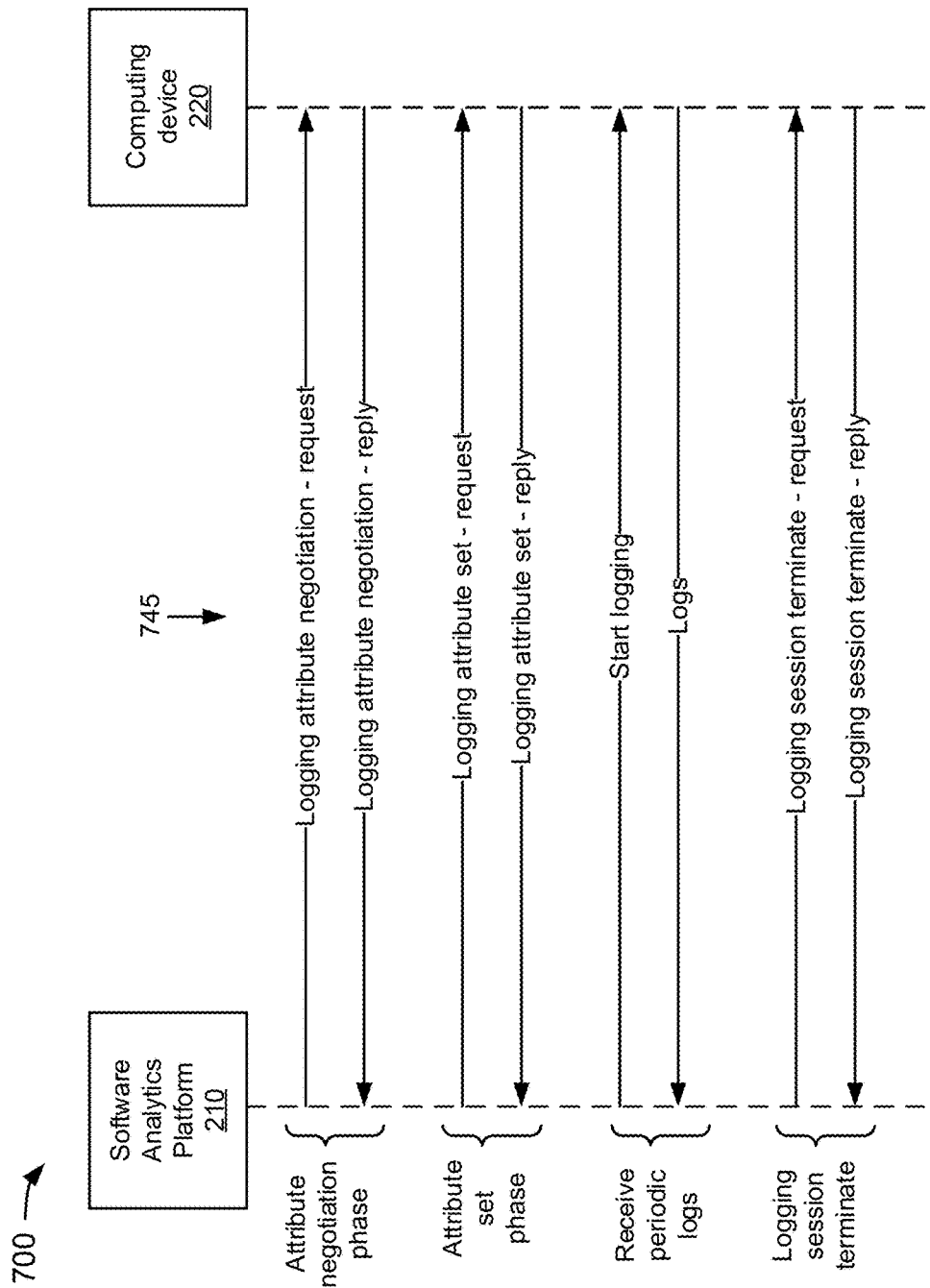

With reference to FIG. 7B, software analytics platform 210 may select protocols that are compatible with the server platform and the network device platform so that attributes of server software program 710 and network software program 720 may be negotiated. For example, as indicated by reference number 730, software analytics platform 210 may select a server protocol to negotiate attributes of server software program 710 with server device 220, and may select a network protocol to negotiate attributes of network software program 720 with network device 220.

In some implementations, using the selected protocols for server device 220 and network device 220, software analytics platform 210 may negotiate the attributes of server software program 710 and network software program 720, with server device 220 and network device 220, respectively. For example, as indicated by reference number 735 in FIG. 7B, software analytics platform 210 may negotiate the attributes of server software program 710, with server device 220, using the server protocol. As shown by reference number 740 in FIG. 7B, software analytics platform 210 may negotiate the attributes of network software program 720, with network device 220, using the network protocol.

In some implementations, software analytics platform 210 may receive information associated with the software programs (e.g., the attributes) based on negotiating the attributes with the server device 220 and network device 220. For example, as shown by reference number 745 in FIG. 7C, during an attribute negotiation phase, software analytics platform 210 may provide a logging attribute negotiation request message (e.g., requesting computing device 220 to negotiate the attributes) to computing device 220 (e.g., server device 220 or network device 220), and computing device 220 may provide a logging attribute negotiation reply message (e.g., indicating that computing device 220 is ready to negotiate the attributes) to software analytics platform 210. During an attribute set phase, software analytics platform 210 may provide a logging attribute set request message (e.g., identifying the attributes that computing device 220 is to provide) to computing device 220, and computing device 220 may provide a logging attribute set reply message (e.g., indicating that computing device 220 is ready to provide the identified attributes) to software analytics platform 210. During a receive periodic logs phase, software analytics platform 210 may provide a start logging message (e.g., requesting that the attributes be sent by computing device 220) to computing device 220, and computing device 220 may periodically provide logs (e.g., the attributes) to software analytics platform 210. During a logging session terminate phase, software analytics platform 210 may provide a logging session terminate request message (e.g., requesting that computing device 220 stop providing the attributes) to computing device 220, and computing device 220 may provide a logging session terminate reply message (e.g., indicating that computing device 220 has stopped providing the attributes) to software analytics platform 210.

As shown by reference number 750 in FIG. 7D, during an attribute update phase, software analytics platform 210 may send a logging attribute update request message (e.g., requesting computing device 220 to provide updated attributes) to computing device 220, and computing device 220 may send a logging attribute update reply message (e.g., indicating that computing device 220 is ready to provide the updated attributes) to software analytics platform 210. During a receive period logs phase, software analytics platform 210 may provide a start logging updated attributes message (e.g., requesting that the updated attributes be sent by computing device 220) to computing device 220, and computing device 220 may periodically provide logs (e.g., the updated attributes) to software analytics platform 210. During a logging session terminate phase, software analytics platform 210 may provide a logging session terminate request message (e.g., requesting that computing device 220 stop providing the updated attributes) to computing device 220, and computing device 220 may provide a logging session terminate reply message (e.g., indicating that computing device 220 has stopped providing the updated attributes) to software analytics platform 210.

Figure 7E:
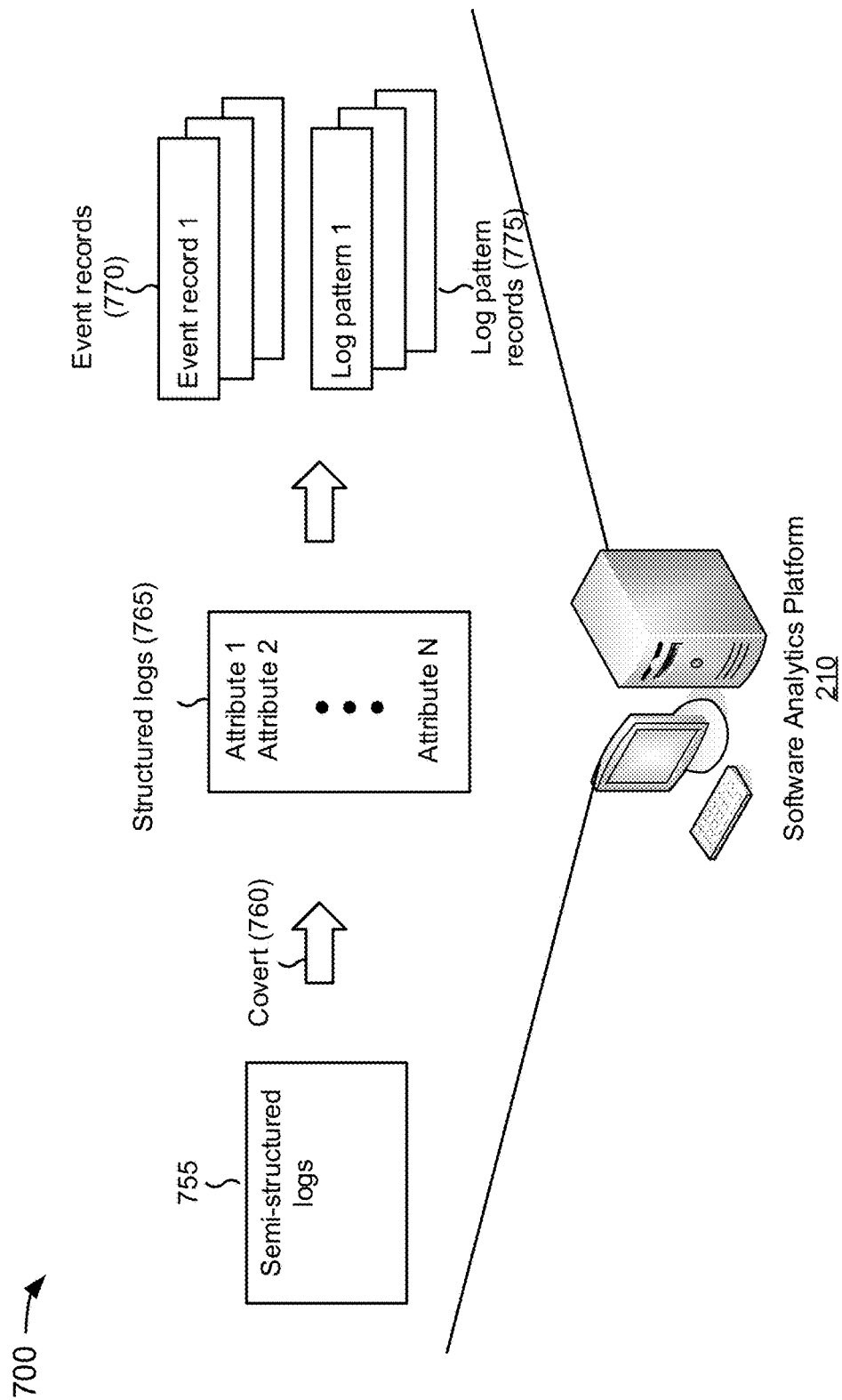

As shown in FIG. 7E, software analytics platform 210 may store (e.g., in a data structure) the attributes received from server device 220 and/or network device 220 as semi-structured logs 755 (e.g., logs in a format received from server device 220 and/or network device 220). As indicated by reference number 760, software analytics platform 210 may convert semi-structured logs 755 into structured logs 765 (e.g., into a format as described above). Structured logs may include one or more attributes (e.g., Attribute 1, Attribute 2, . . . , Attribute N). As further shown in FIG. 7E, software analytics platform 210 may generate one or more event records 770 (e.g., Event record 1) and/or one or more log pattern records 775 (e.g., Log pattern 1) based on structured logs 765.

As indicated above, FIGS. 7A-7E are provided merely as an example. Other examples are possible and may differ from what was described with regard to FIGS. 7A-7E. In some implementations, the various operations described in connection with FIGS. 7A-7E may be performed automatically (without user input) or at the request of a user.

Some implementations, described herein, may provide an automated software analytics platform that utilizes debug and error logs to determine an expected behavior of a software program. For example, the software analytics platform may use the debug and error logs to identify defects in a software program, and to record changes in the expected behavior of the software program. In some implementations, the software analytics platform may generate event records and log patterns, and may perform data analytics on the event records and log patterns. In some implementations, the software analytics platform may identify characteristics of the expected behavior of the software program based on performing the data analytics on the event records and log patterns.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
   one or more processors to:
   determine a platform associated with another device;
   select a protocol compatible with the platform;
   negotiate, with the other device and via the protocol, information associated with a software program executing on the other device to be provided by the other device;
   receive the information associated with the software program based on the negotiation;
   generate event records based on the information associated with the software program;
   identify pattern information associated with the event records;
   perform data analytics on the event records and the pattern information to identify one or more defects associated with the software program and to determine an expected behavior of the software program;
   generate one or more reports based on the one or more defects associated with the software program and the expected behavior of the software program; and
   provide the one or more reports.

2. The device of claim 1, where the one or more processors are further to:
   determine one or more recommendations to address the one or more defects associated with the software program; and
   provide information indicating the one or more recommendations in the one or more reports.

3. The device of claim 1, where the one or more processors are further to:
   determine one or more corrections to address the one or more defects associated with the software program; and
   cause the other device to implement the one or more corrections in the software program.

4. The device of claim 1, where the one or more processors, when receiving the information associated with the software program, are to:
   receive, from the other device, the information associated with the software program based on negotiating attributes of the software program,
   the attributes of the software program corresponding to the information associated with the software program.

5. The device of claim 1, where the one or more processors are further to:
   receive the information associated with the software program in a first format; and
   convert the information associated with the software program from the first format to a second format that is different than the first format.

6. The device of claim 1, where the data analytics includes one or more of:
   a machine learning technique,
   an artificial intelligence technique,
   a data mining technique,
   a modeling technique, or
   a neural network technique.

7. The device of claim 1, where the one or more processors are further to:
   validate a configuration of the software program.

8. A non-transitory computer-readable medium storing instructions, the instructions comprising:
   one or more instructions that, when executed by one or more processors, cause the one or more processors to:
   receive information associated with a software program executing on a device,
   the information associated with the software program being received in a first format;

convert the information associated with the software program from the first format to a second format that is different than the first format;

generate event records based on the information associated with the software program;

identify pattern information associated with the event records;

perform data analytics on the event records and the pattern information to identify one or more defects associated with the software program and to determine an expected behavior of the software program;

generate one or more reports based on the one or more defects associated with the software program and the expected behavior of the software program; and provide the one or more reports.

9. The non-transitory computer-readable medium of claim 8, where the instructions further comprise:

one or more instructions that, when executed by the one or more processors, cause the one or more processors to:

determine one or more recommendations to address the one or more defects associated with the software program; and provide information indicating the one or more recommendations in the one or more reports.

10. The non-transitory computer-readable medium of claim 8, where the instructions further comprise:

one or more instructions that, when executed by the one or more processors, cause the one or more processors to:

determine one or more corrections to address the one or more defects associated with the software program; and cause the device to implement the one or more corrections in the software program.

11. The non-transitory computer-readable medium of claim 8, where the instructions further comprise:

one or more instructions that, when executed by the one or more processors, cause the one or more processors to:

determine a platform associated with the device;

select a protocol compatible with the platform; and negotiate, with the device and via the protocol, attributes of the software program to be provided by the other device.

12. The non-transitory computer-readable medium of claim 11, where the instructions further comprise:

one or more instructions that, when executed by the one or more processors, cause the one or more processors to:

receive, from the device, the information associated with the software program based on negotiating the attributes of the software program, the attributes of the software program corresponding to the information associated with the software program.

13. The non-transitory computer-readable medium of claim 8, where the data analytics includes one or more of:

a machine learning technique, an artificial intelligence technique, a data mining technique, a modeling technique, or a neural network technique.

14. The non-transitory computer-readable medium of claim 8, where the one or more instructions, when executed by the one or more processors, cause the one or more processors to:

validate a configuration of the software program.

15. A method, comprising:

determining, by a device, a platform associated with another device;

selecting, by the device, a protocol compatible with the platform;

negotiating, by the device and with the other device, via the protocol, information associated with a software program executing on the other device to be provided by the other device;

receiving, by the device, the information associated with the software program based on the negotiation;

generating, by the device, event records based on the information associated with the software program;

identifying, by the device, pattern information associated with the event records;

performing, by the device, data analytics on the event records and the pattern information to identify one or more defects associated with the software program and to determine an expected behavior of the software program;

generating, by the device, one or more reports based on the one or more defects associated with the software program and the expected behavior of the software program; and providing, by the device, the one or more reports.

16. The method of claim 15, further comprising:

determining one or more recommendations to address the one or more defects associated with the software program; and providing information indicating the one or more recommendations in the one or more reports.

17. The method of claim 15, further comprising:

determining one or more corrections to address the one or more defects associated with the software program; and causing the other device to implement the one or more corrections in the software program.

18. The method of claim 15, where receiving the information associated with the software program comprises:

receiving, from the other device, the information associated with the software program based on negotiating attributes of the software program, the attributes of the software program corresponding to the information associated with the software program.

19. The method of claim 15, further comprising:

receiving the information associated with the software program in a first format; and converting the information associated with the software program from the first format to a second format that is different than the first format.

20. The method of claim 15, further comprising:

validating a configuration of the software program.

* * * * *